(12) United States Patent
Sani

(10) Patent No.: US 8,821,604 B2
(45) Date of Patent: Sep. 2, 2014

(54) POLYCRYSTALLINE DIAMOND COMPACT AND METHOD OF MAKING SAME

(75) Inventor: Mohammad N. Sani, Orem, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 13/032,350

(22) Filed: Feb. 22, 2011

(65) Prior Publication Data

US 2011/0259648 A1  Oct. 27, 2011

Related U.S. Application Data

(63) Continuation-in-part of application No. 11/983,619, filed on Nov. 9, 2007, now Pat. No. 8,034,136.

(60) Provisional application No. 60/860,098, filed on Nov. 20, 2006, provisional application No. 60/876,701, filed on Dec. 21, 2006.

(51) Int. Cl.
*B24D 3/00* (2006.01)
*B24D 11/00* (2006.01)
*B24D 18/00* (2006.01)
*C09K 3/14* (2006.01)

(52) U.S. Cl.
USPC .............................. 51/293; 51/295; 175/428

(58) Field of Classification Search
None
See application file for complete search history.

(56) References Cited

U.S. PATENT DOCUMENTS

| | | | |
|---|---|---|---|
| 2,349,577 A | 5/1944 | Dean | |
| 3,745,623 A | 7/1973 | Wentorf, Jr. et al. | |
| 3,918,219 A | 11/1975 | Wentorf, Jr. et al. | |
| 4,009,027 A | 2/1977 | Naidich et al. | |
| 4,016,736 A | 4/1977 | Carrison et al. | |
| 4,063,909 A | 12/1977 | Mitchell | |
| 4,084,942 A | 4/1978 | Villalobos | |
| 4,191,735 A | 3/1980 | Nelson et al. | |
| 4,224,380 A | 9/1980 | Bovenkerk et al. | |
| 4,268,276 A | 5/1981 | Bovenkerk | |
| 4,274,900 A | 6/1981 | Mueller et al. | |
| 4,333,902 A | 6/1982 | Hara | |
| 4,410,054 A | 10/1983 | Nagel et al. | |

(Continued)

FOREIGN PATENT DOCUMENTS

| | | |
|---|---|---|
| EP | 0 297 071 | 12/1988 |
| EP | 0 352 811 | 1/1990 |

(Continued)

OTHER PUBLICATIONS

U.S. Appl. No. 13/285,198, filed Oct. 31, 2011, Sani.

(Continued)

*Primary Examiner* — Kaj K Olsen
*Assistant Examiner* — Ross J Christie
(74) *Attorney, Agent, or Firm* — Dorsey & Whitney LLP

(57) ABSTRACT

A polycrystalline diamond compact includes a substrate and a polycrystalline diamond table attached to the substrate. The polycrystalline diamond table includes an upper surface and at least one peripheral surface. Diamond grains of the polycrystalline diamond table define a plurality of interstitial regions. The polycrystalline diamond table includes a region having silicon carbide positioned within at least some of the interstitial regions thereof. In an embodiment, the first region extends over only a selected portion of the upper surface and/or at least a portion of the at least one peripheral surface. In another embodiment, the first region substantially contours the upper surface and a chamfer.

9 Claims, 13 Drawing Sheets

(56) References Cited

U.S. PATENT DOCUMENTS

| | | |
|---|---|---|
| 4,440,573 A | 4/1984 | Ishizuka |
| 4,460,382 A | 7/1984 | Ohno |
| 4,468,138 A | 8/1984 | Nagel |
| 4,560,014 A | 12/1985 | Geczy |
| 4,676,124 A | 6/1987 | Fischer |
| 4,692,418 A | 9/1987 | Boecker et al. |
| 4,738,322 A | 4/1988 | Hall et al. |
| 4,766,027 A | 8/1988 | Burn et al. |
| 4,778,486 A | 10/1988 | Csillag et al. |
| 4,797,326 A | 1/1989 | Csillag |
| 4,811,801 A | 3/1989 | Salesky et al. |
| 4,913,247 A | 4/1990 | Jones |
| 4,940,180 A | 7/1990 | Martell |
| 4,985,051 A | 1/1991 | Ringwood |
| 4,992,082 A | 2/1991 | Drawl et al. |
| 5,011,514 A | 4/1991 | Cho et al. |
| 5,016,718 A | 5/1991 | Tandberg |
| 5,032,147 A | 7/1991 | Frushour |
| 5,049,164 A | 9/1991 | Horton et al. |
| 5,092,687 A | 3/1992 | Hall |
| 5,120,327 A | 6/1992 | Dennis |
| 5,127,923 A | 7/1992 | Bunting et al. |
| 5,135,061 A | 8/1992 | Newton, Jr. |
| 5,151,107 A | 9/1992 | Cho et al. |
| 5,154,245 A | 10/1992 | Waldenstrom et al. |
| 5,173,091 A | 12/1992 | Marek |
| 5,217,154 A | 6/1993 | Elwood et al. |
| 5,326,380 A | 7/1994 | Yao et al. |
| 5,348,109 A | 9/1994 | Griffin et al. |
| 5,355,969 A | 10/1994 | Hardy et al. |
| 5,364,192 A | 11/1994 | Damm et al. |
| 5,368,398 A | 11/1994 | Damm et al. |
| 5,460,233 A | 10/1995 | Meany et al. |
| 5,480,233 A | 1/1996 | Cunningham |
| 5,544,713 A | 8/1996 | Dennis |
| 5,617,997 A | 4/1997 | Kobayashi et al. |
| 5,645,617 A | 7/1997 | Frushour |
| 5,660,075 A | 8/1997 | Johnson et al. |
| 5,876,859 A | 3/1999 | Saxelby, Jr. et al. |
| 5,976,707 A | 11/1999 | Grab |
| 6,054,693 A | 4/2000 | Barmatz et al. |
| 6,165,616 A | 12/2000 | Lemelson et al. |
| 6,209,429 B1 | 4/2001 | Urso, III et al. |
| 6,220,375 B1 | 4/2001 | Butcher et al. |
| 6,302,225 B1 | 10/2001 | Yoshida et al. |
| 6,338,754 B1 | 1/2002 | Cannon et al. |
| 6,344,149 B1 | 2/2002 | Oles |
| 6,390,181 B1 | 5/2002 | Hall et al. |
| 6,410,085 B1 | 6/2002 | Griffin et al. |
| 6,435,058 B1 | 8/2002 | Matthias et al. |
| 6,481,511 B2 | 11/2002 | Matthias et al. |
| 6,544,308 B2 | 4/2003 | Griffin et al. |
| 6,562,462 B2 | 5/2003 | Griffin et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,739,214 B2 | 5/2004 | Griffin et al. |
| 6,749,033 B2 | 6/2004 | Griffin et al. |
| 6,793,681 B1 | 9/2004 | Pope et al. |
| 6,797,326 B2 | 9/2004 | Griffin et al. |
| 6,861,098 B2 | 3/2005 | Griffin et al. |
| 6,861,137 B2 | 3/2005 | Griffin et al. |
| 6,878,447 B2 | 4/2005 | Griffin et al. |
| 6,892,836 B1 | 5/2005 | Eyre et al. |
| 7,060,641 B2 | 6/2006 | Qian et al. |
| 7,377,341 B2 | 5/2008 | Middlemiss et al. |
| 7,384,821 B2 | 6/2008 | Sung |
| 7,473,287 B2 | 1/2009 | Belnap et al. |
| 7,516,804 B2 | 4/2009 | Vail |
| 7,552,782 B1 | 6/2009 | Sexton et al. |
| 7,559,695 B2 | 7/2009 | Sexton et al. |
| 7,569,176 B2 | 8/2009 | Pope et al. |
| 7,635,035 B1 | 12/2009 | Bertagnolli et al. |
| 7,647,933 B2 | 1/2010 | Middlemiss |
| 7,726,421 B2 | 6/2010 | Middlemiss |
| 7,754,333 B2 | 7/2010 | Eyre et al. |
| 7,828,088 B2 | 11/2010 | Middlemiss et al. |
| 7,841,428 B2 | 11/2010 | Bertagnolli |
| 7,866,418 B2 | 1/2011 | Bertagnolli et al. |
| 7,980,334 B2 | 7/2011 | Voronin et al. |
| 8,002,859 B2 | 8/2011 | Griffo et al. |
| 8,066,087 B2 | 11/2011 | Griffo et al. |
| 8,080,071 B1 | 12/2011 | Vail et al. |
| 8,236,074 B1 | 8/2012 | Bertagnolli |
| 8,323,367 B1 | 12/2012 | Bertagnolli |
| 8,328,891 B2 | 12/2012 | Zhang et al. |
| 2003/0019333 A1 | 1/2003 | Scott |
| 2004/0111159 A1 | 6/2004 | Pope et al. |
| 2004/0155096 A1 | 8/2004 | Zimmerman et al. |
| 2005/0044800 A1 | 3/2005 | Hall et al. |
| 2005/0050801 A1 | 3/2005 | Cho et al. |
| 2005/0210755 A1 | 9/2005 | Cho et al. |
| 2005/0230156 A1 | 10/2005 | Belnap et al. |
| 2005/0263328 A1 | 12/2005 | Middlemiss |
| 2006/0060390 A1 | 3/2006 | Eyre |
| 2006/0060392 A1 | 3/2006 | Eyre |
| 2006/0191723 A1 | 8/2006 | Keshavan |
| 2007/0056778 A1 | 3/2007 | Webb et al. |
| 2007/0079994 A1 | 4/2007 | Middlemiss |
| 2007/0187153 A1 | 8/2007 | Bertagnolli |
| 2007/0187155 A1 | 8/2007 | Middlemiss |
| 2007/0284152 A1 | 12/2007 | Eyre et al. |
| 2008/0010905 A1 | 1/2008 | Eyre |
| 2008/0085407 A1 | 4/2008 | Cooley et al. |
| 2008/0115421 A1* | 5/2008 | Sani ............................... 51/295 |
| 2008/0206576 A1 | 8/2008 | Qian et al. |
| 2008/0223575 A1 | 9/2008 | Oldham et al. |
| 2008/0223623 A1 | 9/2008 | Keshavan et al. |
| 2008/0230280 A1 | 9/2008 | Keshavan et al. |
| 2008/0247899 A1 | 10/2008 | Cho et al. |
| 2009/0120009 A1 | 5/2009 | Sung |
| 2009/0152015 A1* | 6/2009 | Sani et al. ........................ 51/307 |
| 2009/0152018 A1* | 6/2009 | Sani ............................... 175/432 |
| 2009/0166094 A1 | 7/2009 | Keshavan et al. |
| 2009/0173015 A1 | 7/2009 | Keshavan et al. |
| 2009/0173547 A1 | 7/2009 | Voronin et al. |
| 2010/0012389 A1 | 1/2010 | Zhang et al. |
| 2010/0038148 A1 | 2/2010 | King |
| 2010/0095602 A1 | 4/2010 | Belnap et al. |
| 2010/0122852 A1 | 5/2010 | Russell et al. |
| 2010/0155149 A1 | 6/2010 | Keshavan et al. |
| 2010/0181117 A1 | 7/2010 | Scott |
| 2010/0212971 A1* | 8/2010 | Mukhopadhyay et al. ... 175/428 |
| 2010/0236836 A1 | 9/2010 | Voronin |
| 2010/0243336 A1 | 9/2010 | Dourfaye et al. |
| 2010/0287845 A1 | 11/2010 | Montross et al. |
| 2011/0023375 A1* | 2/2011 | Sani et al. ........................ 51/297 |
| 2011/0031031 A1* | 2/2011 | Vempati et al. ............... 175/428 |
| 2011/0058909 A1* | 3/2011 | Matsuzawa ................... 407/119 |
| 2011/0067929 A1 | 3/2011 | Mukhopadhyay et al. |
| 2011/0083908 A1 | 4/2011 | Shen et al. |
| 2011/0120782 A1* | 5/2011 | Cooley et al. .................. 51/309 |
| 2011/0284294 A1 | 11/2011 | Cox et al. |
| 2012/0037429 A1 | 2/2012 | Davies et al. |
| 2012/0047815 A1* | 3/2012 | Sani ............................... 51/309 |
| 2012/0103701 A1 | 5/2012 | Cho et al. |
| 2013/0291443 A1 | 11/2013 | Naidoo et al. |

FOREIGN PATENT DOCUMENTS

| | | |
|---|---|---|
| EP | 0 374 424 | 6/1990 |
| EP | 0 699 642 | 3/1996 |
| GB | 2300424 | 11/1996 |
| GB | 2 461 198 | 12/2009 |
| WO | WO 2008/063568 | 5/2008 |
| WO | WO 2010/039346 | 4/2010 |
| WO | WO 2010/098978 | 9/2010 |
| WO | WO 2010/100629 | 9/2010 |
| WO | WO 2010/100630 | 9/2010 |

OTHER PUBLICATIONS

U.S. Appl. No. 13/230,125, filed Sep. 12, 2011, Sani.

(56) References Cited

OTHER PUBLICATIONS

U.S. Appl. No. 11/983,619, Mail Date Sep. 21, 2011, Issue Notification.
U.S. Appl. No. 12/271,081, Mail Date Oct. 5, 2011, Notice of Allowance.
U.S. Appl. No. 13/292,491, filed Nov. 9, 2011, Sani.
International Search Report and Written Opinion from International Application No. PCT/US2011/060380 dated Mar. 12, 2012.
U.S. Appl. No. 13/230,125, Mail Date May 23, 2012, Office Action.
U.S. Appl. No. 13/285,198, Mail Date Apr. 3, 2012, Office Action.
U.S. Appl. No. 11/545,929, filed Oct. 10, 2006, Bertagnolli.
U.S. Appl. No. 12/120,849, filed May 15, 2008, Vail.
U.S. Appl. No. 12/363,104, filed Jan. 30, 2009, Sani.
U.S. Appl. No. 12/961,787, filed Dec. 7, 2010, Mukhopadhyay, et al.
U.S. Appl. No. 60/850,969, filed Oct. 10, 2006, Cooley, et al.
U.S. Appl. No. 60/860,098, filed Nov. 20, 2006, Sani.
U.S. Appl. No. 60/876,701, filed Dec. 21, 2006, Sani.
Ekimov, E.A., et al. "Mechanical Properties and Microstructure of Diamond-SiC Nanocomposites" Inorganic Materials, vol. 38, No. 11, 2002, pp. 1117-1122.
PCT International Search Report and Written Opinion for PCT International Application No. PCT/US2007/024090; Apr. 15, 2008.
Declaration of Prior Sales of Terracut PDCS executed by Kenneth E. Bertagnolli Feb. 3, 2011.
Declaration of Prior Sales of Terracut PDCS executed by Paul D. Jones Feb. 3, 2011.
U.S. Appl. No. 11/983,619, Mail Date May 26, 2010, Restriction Requirement.
U.S. Appl. No. 11/983,619, Mail Date Aug. 9, 2010, Office Action.
U.S. Appl. No. 11/983,619, Mail Date Mar. 28, 2011, Office Action.
U.S. Appl. No. 12/363,104, Mail Date Oct. 14, 2010, Office Action.
U.S. Appl. No. 12/363,104, Mail Date Apr. 12, 2011, Office Action.
U.S. Appl. No. 12/271,081, Mail Date Dec. 22, 2010, Restriction Requirement.
U.S. Appl. No. 12/271,081, Mail Date Mar. 31, 2011, Office Action.
U.S. Appl. No. 11/983,619, Mail Date Jun. 16, 2011, Notice of Allowance.
U.S. Appl. No. 12/363,104, Mail Date Aug. 25, 2011, Notice of Allowance.
U.S. Appl. No. 12/271,081, Mail Date Aug. 8, 2011, Office Action.
U.S. Appl. No. 13/292,491, Mail Date Aug. 8, 2012, Office Action.
U.S. Appl. No. 13/230,125, Mail Date Jul. 11, 2012, Office Action.
U.S. Appl. No. 13/285,198, Mail Date Jul. 11, 2012, Office Action.
U.S. Appl. No. 13/230,125, Mail Date Jan. 18, 2013, Final Office Action.
U.S. Appl. No. 13/292,491, Mail Date Feb. 11, 2013, Office Action.
U.S. Appl. No. 13/285,198, Mail Date Feb. 5, 2013, Notice of Allowance.
U.S. Appl. No. 13/230,125, Mail Date Aug. 21, 2013, Issue Notification.
U.S. Appl. No. 13/690,397, Mail Date Aug. 9, 2013, Office Action.
U.S. Appl. No. 13/917,952, Mail Date Jul. 31, 2013, Office Action.
U.S. Appl. No. 12/961,787, Mail Date Aug. 30, 2013, Office Action.
U.S. Appl. No. 13/953,453, filed Jul. 29, 2013, Sani.
U.S. Appl. No. 12/548,584, Mail Date Jun. 14, 2013, Office Action.
U.S. Appl. No. 13/171,735, Mail Date Jul. 12, 2013, Office Action.
U.S. Appl. No. 13/285,198, Mail Date Jul. 22, 2013, Notice of Allowance.
U.S. Appl. No. 13/292,491, Mail Date Jul. 18, 2013, Office Action.
U.S. Appl. No. 13/027,954, Mail Date Jul. 18, 2013, Office Action.
U.S. Appl. No. 61/068,120, filed Mar. 3, 2008, Vail.
U.S. Appl. No. 12/548,584, filed Aug. 27, 2009, Bertagnolli.
U.S. Appl. No. 13/027,954, filed Feb. 15, 2011, Miess et al.
U.S. Appl. No. 13/100,388, filed May 4, 2011, Jones et al.
U.S. Appl. No. 13/171,735, filed Jun. 29, 2011, Bertagnolli.
U.S. Appl. No. 13/292,900, filed Nov. 9, 2011, Vail.
U.S. Appl. No. 13/323,138, filed Dec. 12, 2011, Miess et al.
U.S. Appl. No. 13/690,397, filed Nov. 30, 2012, Miess et al.
U.S. Appl. No. 13/397,971, filed Feb. 16, 2012, Miess et al.

Akaishi, Minoru, "Synthesis of polycrystalline diamond compact with magnesium carbonate and its physical properties," Diamond and Related Materials, 1996 (pp. 2-7).
Glowka, D.A. & Stone, C.M., "Effects of Termal and Mechanical Loading on PDC Bit Life", SPE Drilling Engineering, Jun. 1986 (pp. 201-214).
Hosomi, Satoru, et al., "Diamond Formation by a Solid State Reaction", Science and Technology of New Diamond, pp. 239-243 (1990).
Hsueh, C.H. & Evans, A.G., "Residual Stresses in Metal/Ceramic Bonded Strips", J. Am. Ceram. Soc., 68 [5] (1985) pp. 241-248.
Ledbetter, H.M., et al. "Elastic Properties of Metals and Alloys. II. Copper", Journal of Physics and Chemical Reference Data, vol. 3, No. 4, 1974. pp. 897-935.
Lin, Tze-Pin; Hood, Michael & Cooper George A., "Residual Stresses in Polycrystalline Diamond Compacts", J. Am. Ceram Soc., 77 [6] (1994) pp. 1562-1568.
Liu, Xueran, et al., "Fabrication of the supersaturated solid solution of carbon in copper by mechanical alloying", Materials Characterization, vol. 58, Issue 8 (Jun. 2007), pp. 504-508.
Orwa, J.O., et al., "Diamond nanocrystals formed by direct implantation of fused silica with carbon," Journal of Applied Physics, vol. 90, No. 6, 2001, pp. 3007-3018.
Radtke, Robert, "Faster Drilling, Longer Life: Thermally Stable Diamond Drill Bit Cutters," Drilling Systems, Summer 2004 (pp. 5-9).
Saji, S., et al., Solid Solubility of Carbon in Copper during Mechanical Alloying, Materials Transactions, vol. 39, No. 7 (1998), pp. 778-781.
Suryanarayana, C., "Novel Methods of Brazing Dissimilar Materials," Advanced Materials & Processes, Mar. 2001 (3 pgs).
Tanaka, T., et al., "Formation of Metastable Phases of Ni-C and Co-C Systems by Mechanical Alloying", Metallurgical Transactions, vol. 23A, Sep. 1992, pp. 2431-2435.
Timoshenko, S.P. & Goodier, J.N., "Theory of Elasticity", McGraw-Hill Classic Textbook Reissue 1934, pp. 8-11, 456-458.
Tomlinson, P.N. et al. "Syndax3 Pins—New Concepts in PCD Drilling," Rock Drilling, IDR Mar. 1992, 1992 (pp. 109-114).
Ueda, Fumihiro, "Cutting performance of sintered diamond with MgCO3 as a sintering agent," Materials Science and Engineering, 1996 (pp. 260-263).
Yamane, T., et al., "Solid solubility of carbon in copper mechanically alloyed", Journal of Materials Science Letters 20 (2001), pp. 259-260.
U.S. Appl. No. 11/545,929, Mail Date Aug. 13, 2008, Office Action.
U.S. Appl. No. 11/545,929, Mail Date Jan. 21, 2009, Office Action.
U.S. Appl. No. 11/545,929, Mail Date Aug. 27, 2009, Office Action.
U.S. Appl. No. 11/545,929, Mail Date Apr. 15, 2010, Office Action.
U.S. Appl. No. 11/545,929, Mail Date Jul. 21, 2010, Advisory Action.
U.S. Appl. No. 11/545,929, Mail Date Mar. 20, 2012, Notice of Allowance.
U.S. Appl. No. 11/545,929, Mail Date Jul. 18, 2012, Issue Notification.
U.S. Appl. No. 12/394,356, Mail Date Sep. 1, 2011, Notice of Allowance.
U.S. Appl. No. 12/394,356, Mail Date Nov. 30, 2011, Issue Notification.
U.S. Appl. No. 12/397,969, Mail Date May 25, 2012, Notice of Allowance.
U.S. Appl. No. 12/397,969, Mail Date Nov. 14, 2012, Issue Notification.
U.S. Appl. No. 12/548,584, Mail Date May 18, 2012, Office Action.
U.S. Appl. No. 12/548,584, Mail Date Oct. 24, 2012, Office Action.
U.S. Appl. No. 12/548,584, Mail Date Jan. 3, 2013, Office Action.
U.S. Appl. No. 13/171,735, Mail Date Aug. 17, 2012, Office Action.
U.S. Appl. No. 13/171,735, Mail Date Jan. 24, 2013, Office Action.
U.S. Appl. No. 13/230,125, Mail Date May 1, 2013, Notice of Allowance.
U.S. Appl. No. 13/690,397, Mail Date Feb. 14, 2013, Office Action.
U.S. Appl. No. 13/690,397, Mail Date May 29, 2013, Notice of Allowance.
U.S. Appl. No. 13/292,900, Mail Date May 23, 2013, Office Action.
U.S. Appl. No. 12/961,787, Mail Date May 29, 2013, Restriction Requirement.

(56) References Cited

OTHER PUBLICATIONS

U.S. Appl. No. 14/067,831, filed Oct. 30, 2013, Bertagnolli et al.
U.S. Appl. No. 14/178,118, filed Feb. 11, 2014, Mukhopadhyay et al.
Decker, et al., "High-Pressure Calibration: A Critical Review," J. Phys. Chem. Ref. Data, 1, 3 (1972).
Rousse, et al. "Structure of the Intermediate Phase of PbTe at High Pressure," Physical Review B: Condensed Matter and Materials Physics, 71, 224116 (2005).
U.S. Appl. No. 12/548,584, Mail Date Sep. 26, 2013, Office Action.
U.S. Appl. No. 12/548,584, Mail Date Mar. 6, 2014, Notice of Allowance.
U.S. Appl. No. 13/100,388, Mail Date Oct. 18, 2013, Office Action.
U.S. Appl. No. 13/100,388, Mail Date Jan. 15, 2014, Office Action.
U.S. Appl. No. 13/171,735, Mail Date Jan. 10, 2014, Office Action.
U.S. Appl. No. 13/285,198, Mail Date Nov. 22, 2013, Notice of Allowance.
U.S. Appl. No. 13/292,491, Mail Date Oct. 29, 2013, Office Action.
U.S. Appl. No. 13/027,954, Mail Date Nov. 13, 2013, Office Action.
U.S. Appl. No. 13/027,954, Mail Date Mar. 10, 2014, Office Action.
U.S. Appl. No. 13/690,397, Mail Date Nov. 25, 2013, Office Action.
U.S. Appl. No. 13/917,952, Mail Date Nov. 13, 2013, Office Action.
U.S. Appl. No. 13/292,900, Mail Date Oct. 22, 2013, Notice of Allowance.
U.S. Appl. No. 13/917,952, Mail Date Feb. 26, 2014, Notice of Allowance.
U.S. Appl. No. 13/292,900, Mail Date Nov. 25, 2013, Notice of Allowance.
U.S. Appl. No. 13/292,900, Mail Date Jan. 30, 2014, Notice of Allowance.
U.S. Appl. No. 13/323,138, Mail Date Oct. 1, 2013, Office Action.
U.S. Appl. No. 13/323,138, Mail Date Nov. 29, 2013, Notice of Allowance.
U.S. Appl. No. 13/953,453, Mail Date Sep. 19, 2013, Office Action.
U.S. Appl. No. 13/953,453, Mail Date Oct. 10, 2013, Office Action.
13/285,198, Apr. 11, 2014, Notice of Allowance.
13/292,491, Mar. 21, 2014, Office Action.
13/690,397, Mar. 12, 2014, Notice of Allowance.
12/961,787, Apr. 11, 2014, Office Action.
13/323,138, Mar. 12, 2014, Notice of Allowance.
13/953,453, Mar. 18, 2014, Office Action.
13/027,954, Jun. 3, 2014, Notice of Allowance.
13/292,900, May 28, 2014, Issue Notification.
13/917,952, Jun. 11, 2014, Issue Notification.
13/171,735, May 7, 2014, Notice of Allowance.
12/548,584, Jun. 25, 2014, Issue Notification.
13/100,388, Jun. 17, 2014, Notice of Allowance.
13/690,397, Jul. 9, 2014, Issue Notification.
13/953,453, Jun. 24, 2014, Notice of Allowance.

* cited by examiner

POLYCRYSTALLINE DIAMOND COMPACT AND METHOD OF MAKING SAME

CROSS-REFERENCE TO RELATED APPLICATIONS

This application is a continuation-in-part of U.S. application Ser. No. 11/983,619 filed on 9 Nov. 2007, which claims the benefit of U.S. Provisional Application No. 60/860,098 filed on 20 Nov. 2006 and U.S. Provisional Application No. 60/876,701 filed on 21 Dec. 2006, the contents of each of the foregoing applications are incorporated herein, in their entirety, by this reference.

BACKGROUND

Wear-resistant, superabrasive compacts are utilized for a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical systems.

PDCs have found particular utility as superabrasive cutting elements in rotary drill bits, such as roller cone drill bits and fixed cutter drill bits. A PDC cutting element or cutter typically includes a superabrasive diamond layer or table. The diamond table is formed and bonded to a substrate using an ultra-high pressure, ultra-high temperature ("HPHT") process. The substrate is often brazed or otherwise joined to an attachment member such as a stud or a cylindrical backing. A stud carrying the PDC may be used as a PDC cutting element when mounted to a bit body of a rotary drill bit by press-fitting, brazing, or otherwise securing the stud into a receptacle formed in the bit body. The PDC cutting element may also be brazed directly into a preformed pocket, socket, or other receptacle formed in the bit body. Generally, a rotary drill bit may include a number of PDC cutting elements affixed to the drill bit body.

Conventional PDCs are normally fabricated by placing a cemented carbide substrate into a container or cartridge with a volume of diamond particles positioned on a surface of the cemented carbide substrate. A number of such cartridges may be typically loaded into an HPHT press. The substrates and volume of diamond particles are then processed under HPHT conditions in the presence of a catalyst material that causes the diamond particles to bond to one another to form a matrix of bonded diamond grains defining a diamond table. The catalyst material is often a solvent catalyst, such as cobalt, nickel, or iron that is used for facilitating the intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to facilitate intergrowth between the diamond particles, which results in formation of bonded diamond grains. Often, a solvent catalyst may be mixed with the diamond particles prior to subjecting the diamond particles and substrate to the HPHT process.

The solvent catalyst dissolves carbon from the diamond particles or portions of the diamond particles that graphitize due to the high temperature being used in the HPHT process. The solubility of the stable diamond phase in the solvent catalyst is lower than that of the metastable graphite under HPHT conditions. As a result of this solubility difference, the undersaturated graphite tends to dissolve into solvent catalyst and the supersaturated diamond tends to deposit onto existing diamond particles to form diamond-to-diamond bonds. Accordingly, diamond grains become mutually bonded to form a matrix of polycrystalline diamond with interstitial regions between the bonded diamond grains being occupied by the solvent catalyst.

The presence of the solvent catalyst in the diamond table is believed to reduce the thermal stability of the diamond table at elevated temperatures. For example, the difference in thermal expansion coefficient between the diamond grains and the solvent catalyst is believed to lead to chipping or cracking in the PDC during drilling or cutting operations, which consequently can degrade the mechanical properties of the PDC or cause failure. Additionally, some of the diamond grains can undergo a chemical breakdown or back-conversion with the solvent catalyst. At extremely high temperatures, portions of diamond grains may transform to carbon monoxide, carbon dioxide, graphite, or combinations thereof, thus, degrading the mechanical properties of the PDC.

Therefore, manufacturers and users of superabrasive materials continue to seek improved thermally stable, superabrasive materials and processing techniques.

SUMMARY

Embodiments of the present invention relate to methods of fabricating superabrasive articles, such as PDCs, and intermediate articles formed during fabrication of such PDCs. Many different PDC embodiments disclosed herein include a thermally-stable polycrystalline diamond table in which silicon carbide occupies a portion of the interstitial regions thereof formed between bonded diamond grains.

In one embodiment of the present invention, a method of fabricating a superabrasive article is disclosed. A mass of unsintered diamond particles may be infiltrated with metal-solvent catalyst from a metal-solvent-catalyst-containing material to promote formation of a sintered body of diamond grains including interstitial regions. At least a portion of the interstitial regions may also be infiltrated with silicon from a silicon-containing material. The silicon reacts with the sintered body to form silicon carbide within a portion of the interstitial regions.

In another embodiment of the present invention, another method of fabricating a superabrasive article is disclosed. At least a portion of interstitial regions of a pre-sintered-polycrystalline diamond body may be infiltrated with silicon from a silicon-containing material. At least a portion of metal-solvent catalyst located within the at least a portion of interstitial regions of the pre-sintered-polycrystalline diamond body may be displaced into a porous mass. The silicon and the pre-sintered-polycrystalline diamond body are reacted to form silicon carbide within the at least a portion of the interstitial regions. A section of the polycrystalline diamond table so-formed may be removed by a suitable material-removal process so that an upper region of the polycrystalline diamond table includes substantially only silicon carbide within the interstitial regions thereof.

In another embodiment of the present invention, a polycrystalline diamond compact includes a substrate and a polycrystalline diamond table attached to the substrate. The polycrystalline diamond table including an upper surface, at least one peripheral surface, and a chamfer extending between the upper surface and the peripheral surface. Diamond grains of the polycrystalline diamond table define a plurality of interstitial regions. The polycrystalline diamond table includes a first region extending inwardly from the upper surface and the chamfer, with the first region substantially contouring the upper surface and the chamfer. The first region includes silicon carbide positioned within at least some of the interstitial regions thereof. The polycrystalline diamond table includes a bonding region bonded to the substrate, with the bonding region including metal-solvent catalyst positioned within a second portion of the interstitial regions.

In a further embodiment of the present invention, a method of fabricating a polycrystalline diamond compact includes positioning an at least partially porous polycrystalline body between a silicon-containing material and a substrate that is adjacent to a metal-solvent catalyst. The at least partially porous polycrystalline body exhibits an upper surface, at least one peripheral surface, and a chamber extending between the upper surface and the at least one peripheral surface. The method further includes subjecting the at least partially porous polycrystalline body, the silicon-containing material, and the substrate to an HPHT process to infiltrate a first region that extends inwardly from the upper surface and the chamfer with silicon from the silicon-containing material.

In yet another embodiment of the present invention, a polycrystalline diamond compact includes a substrate and a polycrystalline diamond table attached to the substrate. The polycrystalline diamond table including an upper surface. Diamond grains of the polycrystalline diamond table define a plurality of interstitial regions. The polycrystalline diamond table includes a first region including silicon carbide positioned within a first portion of the interstitial regions, the first region extending over only a selected portion of the upper surface. The polycrystalline diamond table further includes a bonding region bonded to the substrate, with the bonding region including metal-solvent catalyst positioned within a second portion of the interstitial regions.

In still a further embodiment of the present invention, a method of fabricating a polycrystalline diamond compact includes positioning an at least partially porous polycrystalline body between a silicon-containing material and a substrate adjacent to a metal-solvent catalyst. The at least partially porous polycrystalline body includes an upper surface and at least one peripheral surface, with the silicon-containing material extending over only a portion of the upper surface and/or at least a portion of the at least one peripheral surface. The method further includes subjecting the at least partially porous polycrystalline body, the silicon-containing material, and the substrate to an HPHT process to infiltrate a first region of the at least partially porous polycrystalline body that extends along only a portion of the upper surface thereof.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present invention, wherein like reference numerals refer to like or similar elements in different views or embodiments shown in the drawings.

DETAILED DESCRIPTION

Embodiments of the present invention relate to methods of fabricating superabrasive articles, such as PDCs, and intermediate articles formed during fabrication of such PDCs. For example, many different PDC embodiments disclosed herein include a thermally-stable polycrystalline diamond table in which silicon carbide occupies a portion of the interstitial regions formed between bonded diamond grains. The superabrasive articles disclosed herein may be used in a variety of applications, such as drilling tools (e.g., compacts, cutting elements, gage trimmers, etc.), machining equipment, bearing apparatuses, wire-drawing machinery, and other apparatuses. As used herein, the term "superabrasive" means a material that exhibits a hardness exceeding a hardness of tungsten carbide. For example, a superabrasive article is an article of manufacture, at least a portion of which exhibits a hardness exceeding the hardness of tungsten carbide.

Figure 1A:
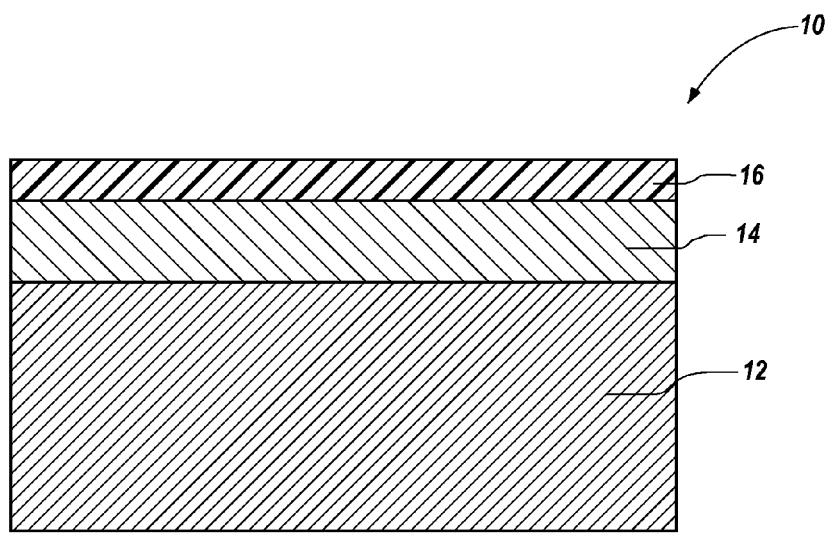
FIG. 1A is a schematic side cross-sectional view of an assembly including a substrate, a porous polycrystalline diamond body, and a silicon-containing material used to fabricate a PDC according to one embodiment of the present invention.

FIGS. 1A-2B show an embodiment of a method according to the present invention for fabricating a PDC and the resulting structure of the PDC. As shown in FIG. 1A, an assembly 10 includes an at least partially porous polycrystalline diamond body 14 (i.e., a pre-sintered-polycrystalline diamond body) positioned adjacent to a substrate 12. The assembly 10 further includes a silicon-containing material 16 positioned adjacent to the polycrystalline diamond body 14 on a side of the polycrystalline diamond body 14 opposite the substrate 12. In one embodiment of the present invention, the silicon-containing material 16 may comprise a green body of elemental silicon particles (e.g., crystalline or amorphous silicon particles) in the form of a tape-casted tape that is placed adjacent to the polycrystalline diamond body 14. In another embodiment of the present invention, the silicon-containing material 16 may comprise a disc of silicon.

Still referring to FIG. 1A, the polycrystalline diamond body 14 includes a plurality of interstitial regions that were previously occupied by metal-solvent catalyst. The polycrystalline diamond body 14 may be fabricated by subjecting a plurality of diamond particles (e.g., diamond particles having an average particle size between 0.5 µm to about 150 µm) to an HPHT sintering process in the presence of a metal-solvent catalyst, such as cobalt, or other catalyst to facilitate intergrowth between the diamond particles to form a polycrystalline diamond table of bonded diamond grains. In one embodiment of the present invention, the sintered diamond grains of the polycrystalline diamond body 14 may exhibit an average grain size of about 20 µm or less. The polycrystalline diamond table so-formed may be immersed in an acid, such as aqua-regia, a solution of 90% nitric acid/10% de-ionized water, or subjected to another suitable process to remove at least a portion of the metal-solvent catalyst from the interstitial regions of the polycrystalline diamond table.

In one embodiment of the present invention, the polycrystalline diamond table is not formed by sintering the diamond particles on a cemented-tungsten-carbide substrate or otherwise in the presence of tungsten carbide. In such an embodiment, the interstitial regions of the polycrystalline diamond body 14 may contain no tungsten and/or tungsten carbide or insignificant amounts of tungsten and/or tungsten carbide, which can inhibit removal of the metal-solvent catalyst.

In other embodiments of the present invention, a polycrystalline diamond table may be formed by HPHT sintering diamond particles in the presence of tungsten carbide. For example, diamond particles may be placed adjacent to a cemented tungsten carbide substrate and/or tungsten carbide particles may be mixed with the diamond particles prior to HPHT sintering. In such an embodiment, the polycrystalline diamond table so-formed may include tungsten and/or tungsten carbide that is swept in with metal-solvent catalyst from the substrate or intentionally mixed with the diamond particles during HPHT sintering process. For example, some tungsten and/or tungsten carbide from the substrate may be dissolved or otherwise transferred by the liquefied metal-solvent catalyst (e.g., cobalt from a cobalt-cemented tungsten carbide substrate) of the substrate that sweeps into the diamond particles. The polycrystalline diamond table so-formed may be separated from the substrate using a lapping process, a grinding process, wire-electrical-discharge machining ("wire EDM"), or another suitable material-removal process. The separated polycrystalline diamond table may be immersed in a suitable acid (e.g., a hydrochloric acid/hydrogen peroxide solution) to remove substantially all of the metal-solvent catalyst from the interstitial regions and form the polycrystalline diamond body 14. However, an indeterminate amount of tungsten and/or tungsten carbide may remain distributed throughout the polycrystalline diamond body 14 even after leaching. The presence of the tungsten and/or tungsten carbide within the polycrystalline diamond body 14 is currently believed to significantly improve the abrasion resistance thereof even after infiltration with silicon and HPHT bonding to the substrate 12, as will discussed in more detail below.

Figure 1B:
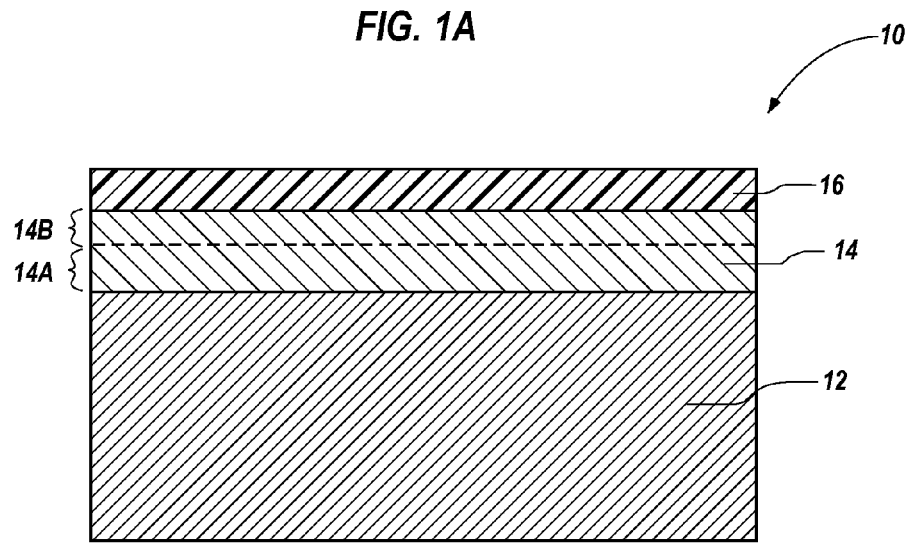
FIG. 1B is a schematic side cross-sectional view of an assembly including a substrate, a porous polycrystalline diamond body in which a region remote from the substrate contains tungsten carbide, and a silicon-containing material used to fabricate a PDC according to one embodiment of the present invention.

In a variation of the above-described embodiment in which the polycrystalline diamond body 14 has tungsten and/or tungsten carbide distributed therein, the polycrystalline diamond body 14 may comprise a first portion including tungsten and/or tungsten carbide and a second portion that is substantially free of tungsten and/or tungsten carbide. For example, a layer of metal-solvent catalyst (e.g., cobalt) may be positioned between diamond particles and a cemented carbide substrate (e.g., cobalt-cemented tungsten carbide substrate) and subjected to HPHT conditions. During the HPHT sintering process, metal-solvent catalyst from the layer sweeps through the diamond particles to effect intergrowth and bonding. Because the volume of the layer of metal-solvent catalyst is selected so that it is not sufficient to fill the volume of all of the interstitial regions between the diamond particles, metal-solvent catalyst from the substrate also sweeps in, which may carry or transfer tungsten and/or tungsten carbide. Thus, a first region of the polycrystalline diamond table so-formed adjacent to the substrate includes tungsten and/or tungsten carbide and a second region remote from the substrate is substantially free of tungsten and/or tungsten carbide. The volume of the layer of metal-solvent catalyst may be selected so that the second region exhibits a thickness substantially greater than the second region. In this embodiment, the metal-solvent catalyst within the interstitial regions between bonded diamond grains of the polycrystalline diamond table may be removed from the second region more easily. For example, the metal-solvent catalyst may be leached from the first region using a hydrochloric acid/hydrogen peroxide solution and the metal-solvent catalyst in the second region may be leached using a less aggressive nitric acid/hydrofluoric acid solution. As shown in FIG. 1B, the polycrystalline diamond body 14 so-formed after leaching may be oriented with the second region (shown as 14A) that is substantially free of tungsten and/or tungsten carbide positioned adjacent to the substrate 12 in the assembly 10 and the first region (shown as 14B) that includes tungsten and/or tungsten carbide positioned remote from the substrate 12 to form at least part of a working or cutting region of a PDC that is ultimately formed after processing.

Referring again to FIG. 1A, in another embodiment of the present invention, the polycrystalline diamond body 14 may be formed by sintering diamond particles or other particles capable of forming diamond in response to an HPHT sintering process without a catalyst. For example, U.S. Pat. Nos. 7,516,804 and 7,841,428, each of which is incorporated herein, in its entirety, by this reference, disclose that ultra-dispersed diamond particles and fullerenes may be mixed with diamond particles and HPHT sintered to form a polycrystalline diamond body.

The substrate 12 may comprise a cemented-carbide material, such as a cobalt-cemented tungsten carbide material or another suitable material. For example, nickel, iron, and alloys thereof are other metal-solvent catalysts that may comprise the substrate 12. Other materials that may comprise the substrate 12 include, without limitation, cemented carbides including titanium carbide, niobium carbide, tantalum carbide, vanadium carbide, and combinations of any of the preceding carbides cemented with iron, nickel, cobalt, or alloys thereof. A representative thickness for the substrate 12 is a thickness of about 0.100 inches to at least about 0.350 inches, more particularly about 0.150 inches to at least about 0.300 inches, and even more particularly about 0.170 inches to at least about 0.290 inches.

Figure 2A:
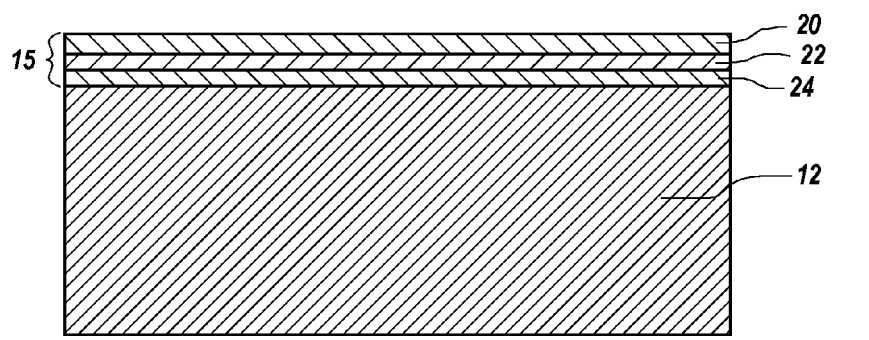
FIG. 2A is a schematic side cross-sectional view of the PDC resulting from HPHT processing of the assembly shown in FIG. 1A.
Figure 2B:
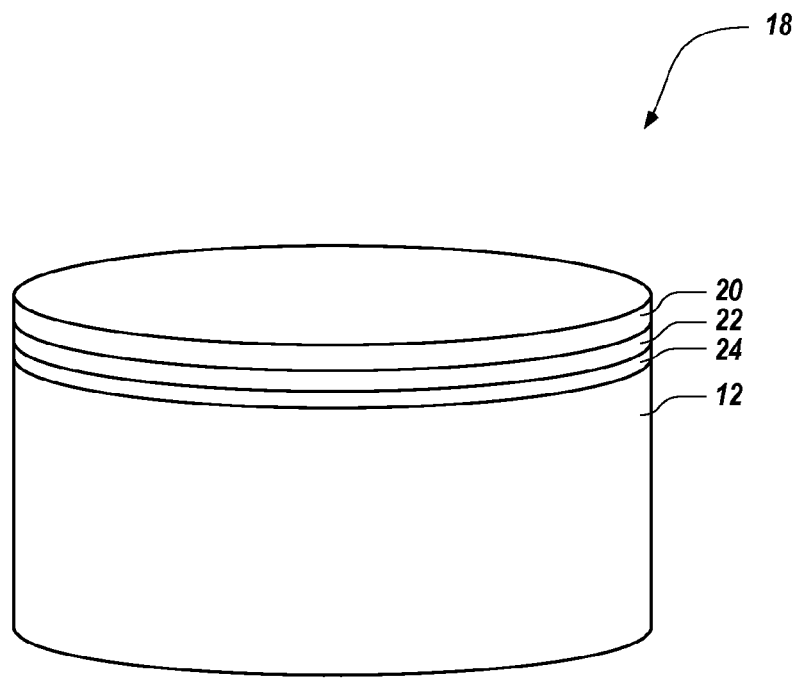
FIG. 2B is a schematic perspective view of the PDC shown in FIG. 2A.

The assembly 10 may be placed in a pressure transmitting medium, such as a refractory metal can, graphite structure, pyrophyllite or other pressure transmitting structure, or another suitable container or supporting element. Methods and apparatuses for sealing enclosures suitable for holding the assembly 10 are disclosed in U.S. patent application Ser. No. 11/545,929, which is incorporated herein, in its entirety, by this reference. The pressure transmitting medium, including the assembly 10, is subjected to an HPHT process using an ultra-high pressure press at a temperature of at least about 1000° Celsius (e.g., about 1300° Celsius to about 1600° Celsius) and a pressure of at least 40 kilobar (e.g., about 50 kilobar to about 70 kilobar) for a time sufficient to sinter the assembly 10 and form a PDC 18 as shown in FIGS. 2A and 2B. Stated another way, the HPHT bonds the polycrystalline diamond body 14 to the substrate 12 and causes at least partial infiltration of the silicon into the polycrystalline diamond body 14. The HPHT temperature may be sufficient to melt at least one constituent of the substrate 12 (e.g., cobalt, nickel, iron, or another constituent) and the silicon of the silicon-containing material 16. The PDC 18 may exhibit other geometries than the geometry illustrated in FIGS. 2A and 2B. For example, the PDC 18 may exhibit a non-cylindrical geometry.

As shown in FIGS. 2A and 2B, the HPHT sintered PDC 18 comprises a polycrystalline diamond table 15 that may include three regions: a first region 20, a second-intermediate region 22, and a third region 24 (i.e., a bonding region). The first region 20 includes polycrystalline diamond with substantially only silicon carbide formed within at least some of the interstitial regions between the bonded diamond grains of the first region 20. It is noted that the interstitial regions of at least the first region 20 may also include tungsten carbide when tungsten carbide is present in the polycrystalline diamond body 14, such as in the embodiment shown in FIG. 1B. During the HPHT process, silicon from the silicon-containing material 16 liquefies and at least partially infiltrates the interstitial regions of the polycrystalline diamond body 14. The silicon reacts with the diamond grains of the polycrystalline diamond body 14 to form silicon carbide, which occupies at least some of the interstitial regions between the diamond grains and bonds to the diamond grains. Further, the amount of the silicon-containing material 16 may be selected so that the silicon of the silicon-containing material 16 fills a selected portion of the interstitial regions of the polycrystalline diamond body 14.

During the HPHT process, metal-solvent catalyst from the substrate 12 or another source also sweeps into the interstitial regions of the polycrystalline diamond body 14 and fills some of the interstitial regions thereof, in addition to silicon carbide filling other interstitial regions as previously described with respect to the first region 20. In one embodiment of the present invention, the second-intermediate region 22 of the polycrystalline diamond table 15 may include polycrystalline diamond with silicon carbide formed within a portion of the interstitial regions between the bonded diamond grains of the second-intermediate region 22 and metal-solvent catalyst (e.g., cobalt) occupying another portion of the interstitial regions between the bonded diamond grains of the second-intermediate region 22. In another embodiment of the present invention, substantially all of or only a portion of the interstitial regions of the second-intermediate region 22 may include an alloy of silicon and the metal-solvent catalyst, such as a silicon-cobalt solid solution alloy or an intermetallic compound of cobalt and silicon. In yet another embodiment of the present invention, at least some of the interstitial regions of the second-intermediate region 22 of the polycrystalline diamond table 15 may include one or more of the following materials: silicon carbide, metal-solvent catalyst, silicon, and an alloy of silicon and metal-solvent catalyst. The third region 24 includes polycrystalline diamond with substantially only metal-solvent catalyst (e.g., cobalt) occupying at least some of the interstitial regions between the bonded diamond grains. The metal-solvent catalyst occupying the interstitial regions of the third region 24 is liquefied and swept into the polycrystalline diamond body 14 from the substrate 12 or another source (e.g., a metal disk, particles, etc.) during the HPHT process. The third region 24 provides a strong, metallurgical bond between the substrate 12 and the polycrystalline diamond table 15 to thereby function as a bonding region. It is noted that at least the first region 20 of the polycrystalline diamond table 15 may be substantially free of non-silicon carbide type carbides, such as tungsten carbide, when the polycrystalline diamond body 14 is not formed in the presence of tungsten carbide.

The PDC 18 shown in FIGS. 2A and 2B exhibits an improved thermal stability relative to a conventional PDC in which the interstitial regions of the diamond table are occupied with only cobalt or another metal-solvent catalyst. Additionally, the wear resistance of the PDC 18 may be improved relative to a conventional PDC because the silicon carbide phase occupying the interstitial regions of the first region 20 exhibits a hardness greater than a hardness of cobalt or other metal-solvent catalysts.

Figure 2C:
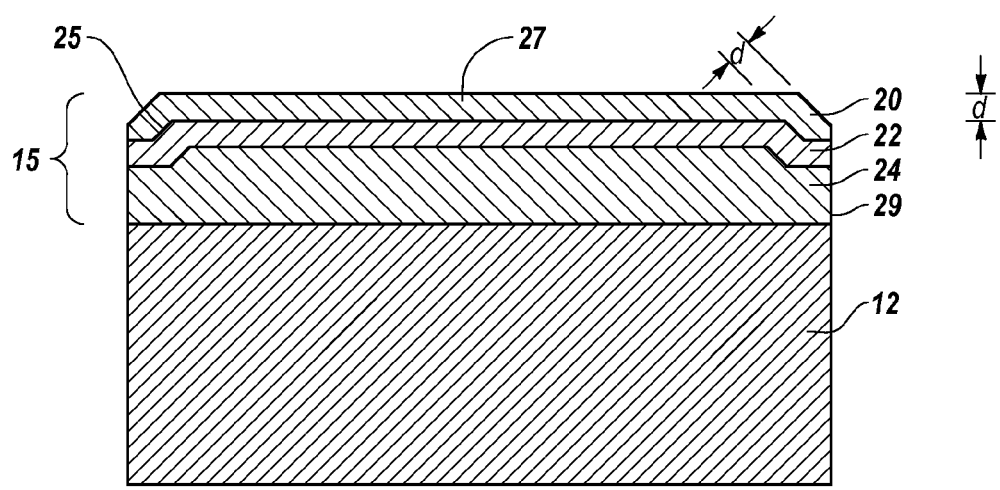
FIG. 2C is a schematic cross-sectional view of the PDC so-formed when the polycrystalline diamond body shown in FIG. 1A includes a preformed chamfer according to another embodiment.

The PDC 18 may also include a chamfer along a peripheral region thereof, which may be preformed in the polycrystalline diamond body 14 (e.g., by machining or grinding) or may be machined in the polycrystalline diamond table 15 after formation of the PDC 18. For example, FIG. 2C is a cross-sectional view of the PDC 18 so-formed when the polycrystalline diamond body 14 exhibits a preformed chamfer according to another embodiment. In such an embodiment, at least the first region 20 and, in some cases, the second-intermediate region 22 substantially contours a preformed chamfer 25 and an upper surface 27 of the polycrystalline diamond table 15, with the chamfer 25 extending between the upper surface 27 and at least one peripheral surface 29. As the polycrystalline diamond table 15 had a preformed chamfer, the silicon infiltrates into the polycrystalline diamond table 15 so that a depth "d" of the first region 20 is substantially the same when measured from the upper surface 27 and the chamfer 25. The depth "d" may be about 50 μm to about 1000 μm, about 150 μm to about 500 μm, or about 100 μm to about 200 μm.

Although the assembly 10 shown in FIGS. 1A and 1B includes the substrate 12, in another embodiment of the present invention, the substrate 12 may be omitted. In such an embodiment of the present invention, an assembly of the polycrystalline diamond body 14 and the silicon-containing material 16 may be subjected to an HPHT process to form a polycrystalline diamond table. After the HPHT process, a carbide layer (e.g., a tungsten carbide layer) may be deposited on the polycrystalline diamond table, as disclosed in U.S. Patent Application Publication No. 20080085407, to form a PDC and enable attaching the PDC to a bit body of a rotary drill bit. U.S. Patent Application Publication No. 20080085407 is incorporated herein, in its entirety, by this reference. In another embodiment of the present invention, the polycrystalline diamond table may be brazed or otherwise secured to a bit body of a rotary drill bit.

Figure 3A:
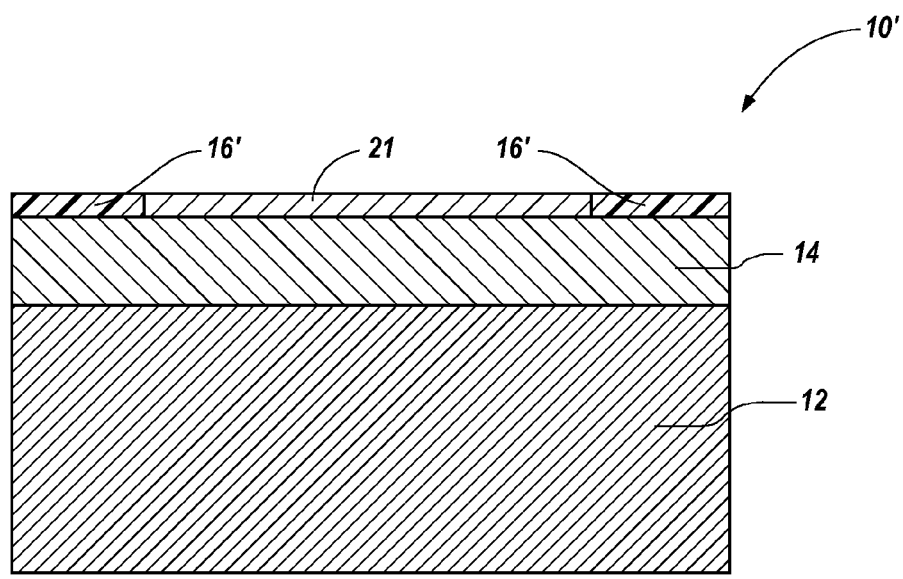
FIG. 3A is a schematic side cross-sectional view of another assembly that may be used to form a PDC with a selectively-shaped cutting region according to another embodiment of the present invention.

One of ordinary skill in the art will recognize that many variations for selectively forming silicon carbide regions within a pre-sintered-polycrystalline-diamond body may be employed. For example, in another embodiment of the present invention, a PDC may be formed with a polycrystalline diamond table including a cutting region exhibiting a selected configuration. The cutting region may comprise bonded diamond grains with silicon carbide within at least some of the interstitial regions between the bonded diamond grains. By only infiltrating a selected region of an at least partially porous polycrystalline diamond body with silicon, the toughness may be improved. As shown in FIG. 3A, a silicon-containing material 16' in the form of body of silicon or amorphous silicon, green body of silicon particles in the form of a tape-casted tape in the form of a tape-casted tape may be placed adjacent to the polycrystalline diamond body 14. For example, the silicon-containing material 16' may exhibit an annular geometry, a wedge-shaped geometry, or another suitable geometry. A mask 21 (e.g., a mica disk or other ceramic mask) may be disposed adjacent to the silicon-containing material 16' to cover regions of the polycrystalline diamond body 14 that are not covered by silicon-containing material 16' help prevent silicon infiltration into the masked region of the polycrystalline diamond body 14.

Figure 4A:
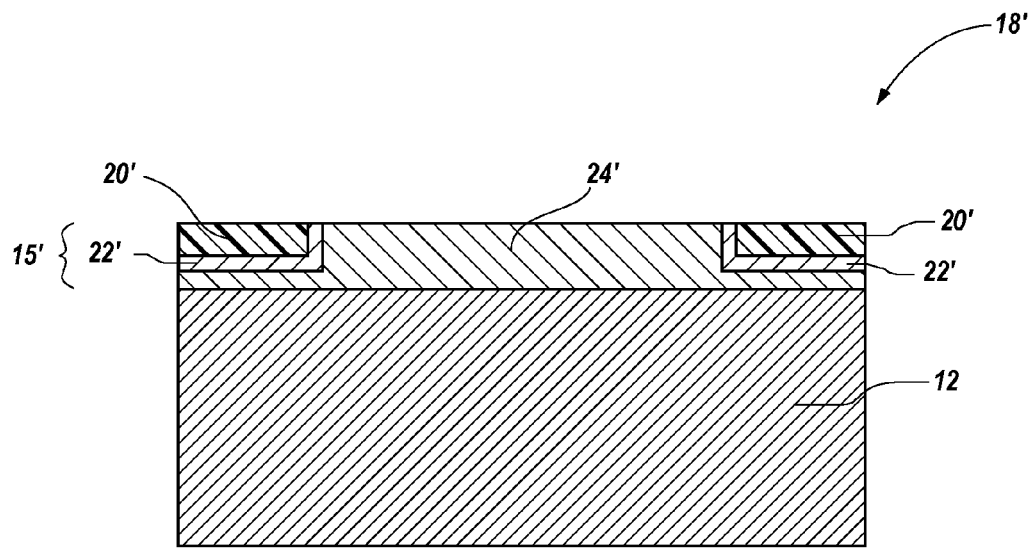
FIG. 4A is a schematic side cross-sectional view of the PDC resulting from HPHT processing of the assembly shown in FIG. 3A.

As shown in FIG. 4A, upon subjecting assembly 10' to HPHT conditions as described generally hereinabove with respect to the assembly 10, a PDC 18' is formed with a polycrystalline diamond table 15' including cutting region 20' formed peripherally about intermediate region 22' and a third region 24'. The cutting region 20' comprises bonded diamond grains with substantially only silicon carbide within the interstitial regions between the bonded diamond grains. In one embodiment of the present invention, the intermediate region 22' comprises bonded diamond grains with silicon carbide within a portion of the interstitial regions and metal-solvent catalyst from the substrate 12 or another source within another portion of the interstitial regions. In another embodiment of the present invention, substantially all of or only a portion of the interstitial regions of the second-intermediate region 22' includes an alloy of silicon and metal-solvent catalyst, such as a silicon-cobalt solid solution alloy or an intermetallic compound of cobalt and silicon. In yet another embodiment of the present invention, at least some of the interstitial regions of the second-intermediate region 22' of the polycrystalline diamond table 15' may include one or more of the following materials: silicon carbide, metal-solvent catalyst, silicon, and an alloy of silicon and metal-solvent catalyst. The third region 24' is formed adjacent to the substrate 12 and provides a strong, metallurgical bond between the polycrystalline diamond table 15' and the substrate 12. The third region 24' comprises bonded diamond grains with substantially only the metal-solvent catalyst from the substrate 12 or another source within the interstitial regions between the bonded diamond grains. The third region 24' provides a tough core that compliments the more thermally-stable first region 20'. Depending upon the geometry of the silicon-containing material 16', the geometry of the cutting region 20' of the polycrystalline diamond table 15' may also be formed to exhibit other selected geometries.

Figure 4B:
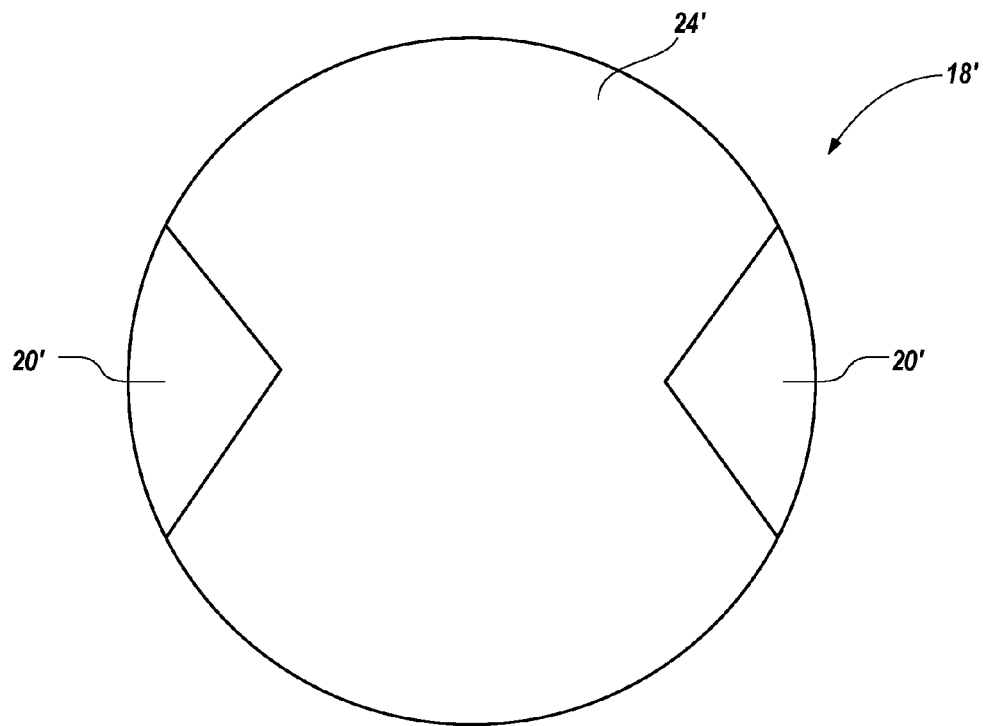
FIG. 4B is a schematic top plan view of the PDC resulting from HPHT processing of the assembly shown in FIG. 3A when the silicon-containing material included multiple wedge-shaped portions.

FIG. 4B is a top plan view of the PCD table 15' when the silicon-containing material 16' exhibited a wedge-shaped geometry, with multiple wedge-shaped portions forming the cutting region 20'. Of course, other geometries may be employed for the cutting region 20' and the intermediate region 22' that depart from the illustrated geometry shown in FIG. 4B. For example, the cutting region 20' and the intermediate region 22' may exhibit an annular geometry, as described hereinabove, or another selected geometry.

Of course, in any of the embodiments described herein that selectively infiltrate the polycrystalline diamond body 14 with silicon, the polycrystalline diamond body 14 may also be chamfered. However, the polycrystalline diamond table 15' may also be chamfered after being formed.

In some embodiments, the polycrystalline diamond table 15' may be subjected to a leaching process to deplete the third region 24' shown in FIGS. 4A and 4B of metal-solvent catalyst (e.g., cobalt). Leaching the third region 24' may improve the overall thermal-stability of the polycrystalline diamond table 15'. The metal-solvent catalyst may be depleted from the third region 24' to a selected depth from the upper surface and the peripheral surface. For example, the leach depth may be about 50 μm to about 1000 μm, about 150 μm to about 500 μm, or about 100 μm to about 200 μm. The leaching may be performed to remove substantially all of the metal-solvent catalyst from the third region 24'.

Figure 3B:
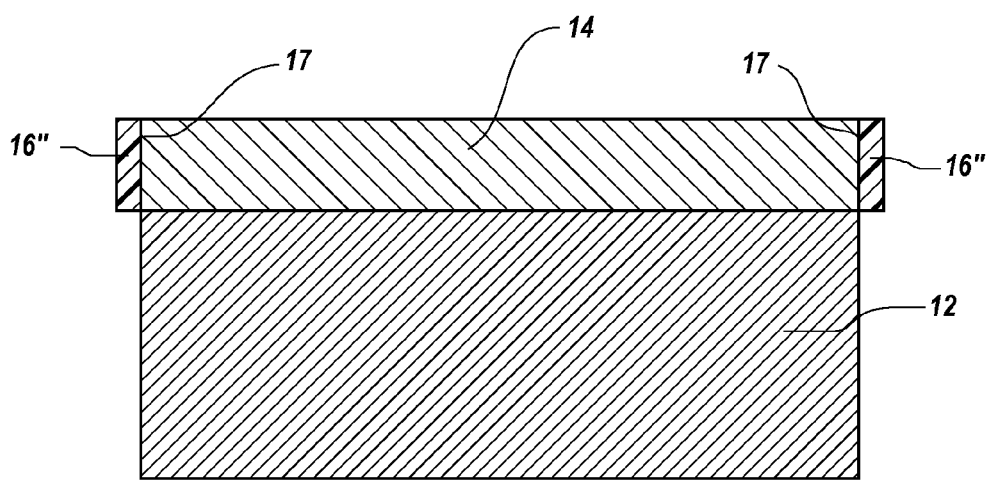
FIG. 3B is a schematic side cross-sectional view of another assembly that may be used to form a PDC in which silicon infiltrates into a polycrystalline diamond body through sides thereof according to another embodiment of the present invention.

FIG. 3B shows another embodiment of the present invention in which a silicon-containing material 16" may be positioned adjacent to at least one peripheral surface 17 of the polycrystalline diamond body 14. HPHT processing causes silicon from the silicon-containing material 16" to at least partially or substantially infiltrate the polycrystalline diamond body 14. For example, the silicon from the silicon-containing material 16" may partially infiltrate the polycrystalline diamond body 14 to form a PDC including a multi-region polycrystalline diamond table.

Figure 5:
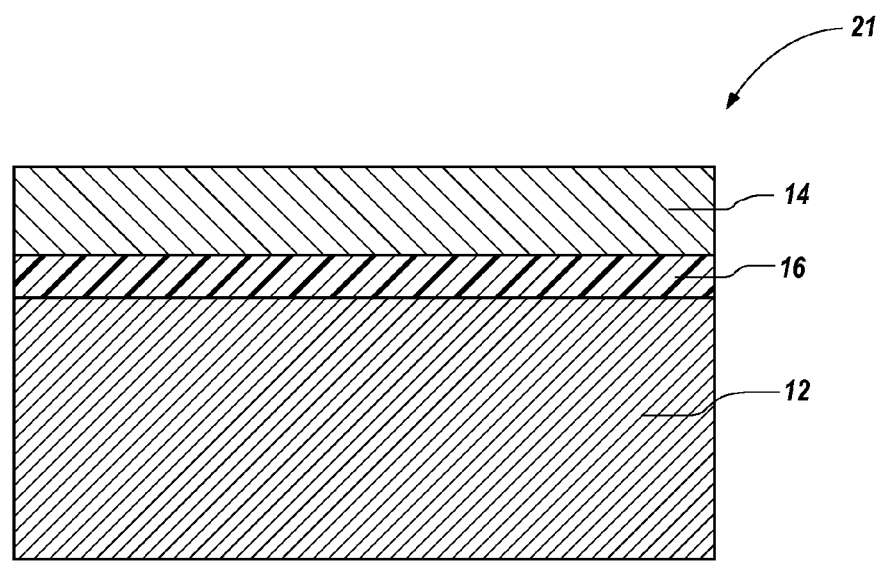
FIG. 5 is a schematic side cross-sectional view of another assembly that may be used to form the PDC shown in FIGS. 2A and 2B according to another embodiment of the present invention.

As shown in FIG. 5, in another embodiment of the present invention, the PDC 18 may be formed by subjecting an assembly 21 to HPHT conditions similar to that employed on the assembly 10. The assembly 21 includes a silicon-containing material 16 positioned adjacent to a substrate 12, and between the substrate 12 and a polycrystalline diamond body 14. During HPHT processing, the assembly 21 is heated at a sufficient rate so that the metal-solvent catalyst (e.g., cobalt) and the silicon in the silicon-containing material 16 are in a liquid state at substantially the same time. Such heating may cause the molten, metal-solvent catalyst (e.g., from the substrate 12, metal-solvent catalyst mixed with the silicon-containing material 16, or another source) to occupy a portion of the interstitial regions of the polycrystalline diamond body 14 and may cause the molten silicon to occupy other portions of the interstitial regions of the polycrystalline diamond body 14. Upon cooling, the resultant, as-sintered PDC may exhibit a similar multi-region diamond table as the polycrystalline diamond table 15 shown in FIGS. 2A and 2B.

Figure 6:
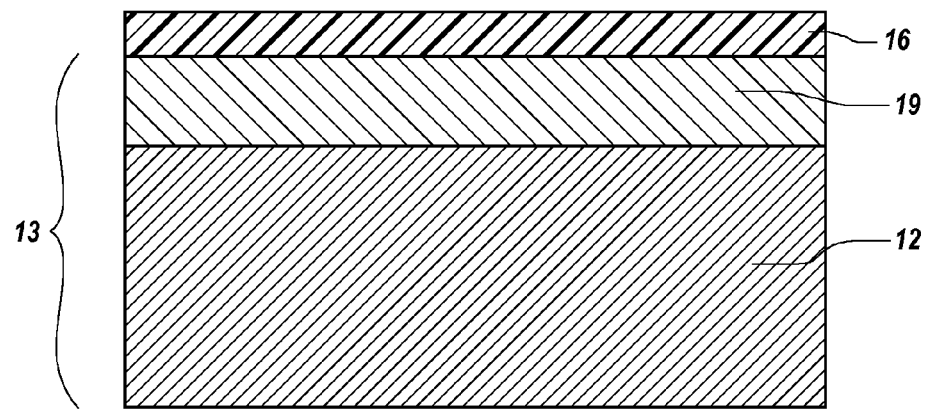
FIG. 6 is a schematic side cross-sectional view of another assembly that may be used to form the PDC shown in FIGS. 2A and 2B according to yet another embodiment of the present invention.

FIG. 6 shows another embodiment of the present invention in which a PDC 13 including a leached polycrystalline diamond table 19 and a silicon-containing material 16 are assembled and HPHT processed using HPHT conditions as described generally hereinabove with respect to the assembly 10. In this embodiment, the PDC 13 may be formed from a conventional PDC with a polycrystalline diamond table that comprises bonded diamond grains with cobalt or another metal-solvent catalyst occupying the interstitial regions between the bonded diamond grains. The metal-solvent catalyst may be substantially removed from the polycrystalline diamond table by leaching using an acid, such as aqua-regia, a solution of 90% nitric acid/10% de-ionized water, or another suitable process to remove at least a portion of the metal-solvent catalyst from the interstitial regions of the polycrystalline diamond table. After removal of the metal-solvent catalyst from the PDC 13, a silicon-containing material 16 may be positioned adjacent to the leached polycrystalline diamond table 19 on a side thereof opposite the substrate 12. The leached polycrystalline diamond table 19 and the silicon-containing material 16 are subjected to an HPHT process to infiltrate the leached polycrystalline diamond table 19 with silicon from the silicon-containing material 16 to form a PDC having a polycrystalline diamond table with the same or similar construction as the polycrystalline diamond table 15 shown in FIGS. 2A and 2B.

Figure 7:
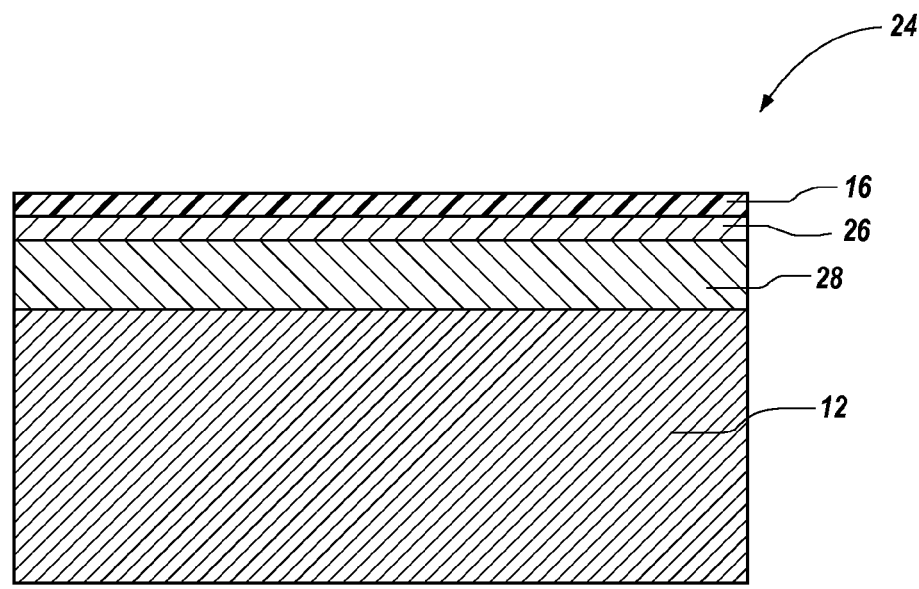
FIG. 7 is a schematic side cross-sectional view of an assembly including a substrate, unsintered diamond particles, a metal-solvent-catalyst material, and a silicon-containing material used to fabricate a PDC according to another embodiment of the present invention.
Figure 8:
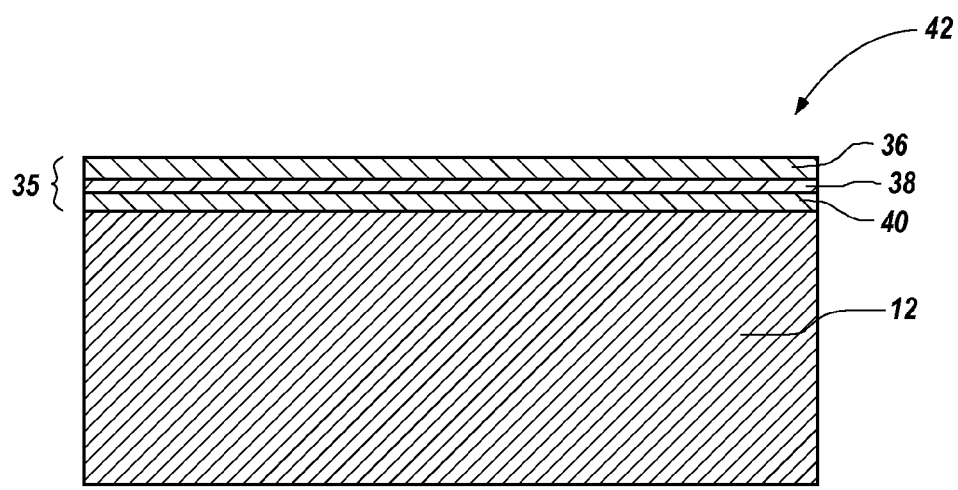
FIG. 8 is a schematic side cross-sectional view of the PDC resulting from HPHT processing of the assembly shown in FIG. 7.

FIGS. 7 and 8 show another embodiment of a method according to the present invention for forming a PDC. As shown in FIG. 7, an assembly 24 includes a mass of unsintered diamond particles 28 positioned adjacent to the substrate 12. The mass of unsintered diamond particles 28 may be a green body of diamond particles 28 in the form of a tape-casted tape. In one embodiment of the present invention, the diamond particles 28 may exhibit an average particle size of about 20 μm or less. In another embodiment of the present invention, the diamond particles 28 may exhibit an average particle size of about 5 μm to about 50 μm. The mass of unsintered diamond particles 28 may exhibit a thickness, for example, of about 0.150 inches to about 0.200 inches. The assembly 24 further includes a metal-solvent-catalyst-containing material 26 positioned adjacent to the mass of diamond particles 28, and a silicon-containing material 16 positioned adjacent to the metal-solvent-catalyst-containing material 26. The metal-solvent-catalyst-containing material 26 may include or may be formed from a material, such as cobalt, nickel, iron, or alloys thereof. The metal-solvent-catalyst-containing material 26 may also be a green body of metal-solvent-catalyst particles in the form of a tape-casted tape, a thin disc of metal-solvent-catalyst material, or any other suitable metal-solvent-catalyst material or structure, without limitation.

The assembly 24 may be subjected to an HPHT sintering process using HPHT process conditions similar to those previously discussed to form a PDC 42 shown in FIG. 8. During HPHT sintering, the metal-solvent catalyst of the metal-solvent-catalyst-containing material 26 melts and infiltrates the diamond particles 28 to effect intergrowth between the diamond particles 28. Molten silicon from the silicon-containing material 16 also infiltrates the diamond particles 28 and the infiltration by the molten silicon follows the infiltration of the metal-solvent catalyst. Thus, the metal-solvent catalyst from the metal-solvent-catalyst-containing material 26 promotes bonding of the diamond particles 28 to form polycrystalline diamond and the silicon infiltrates the polycrystalline diamond so-formed. The silicon reacts with the diamond grains of the polycrystalline diamond to form silicon carbide within some of the interstitial regions between the bonded diamond grains. The amount of the silicon-containing material 16 metal-solvent-catalyst-containing material 26 may be selected so that the silicon of the silicon-containing material 16 and the metal-solvent catalyst from the metal-solvent-catalyst-containing material 26, respectively, only fill a portion of the interstitial regions of the polycrystalline diamond formed during the HPHT process.

As shown in FIG. 8, the PDC 42 formed by HPHT sintering the assembly 24 includes a multi-region polycrystalline diamond table 35 similar in configuration to the polycrystalline diamond table 15 shown in FIGS. 2A and 2B. The polycrystalline diamond table 35 includes: a first region 36, a second-intermediate region 38, and a third region 40. The first region 36 includes substantially only silicon carbide within at least some of the interstitial regions between the bonded diamond grains. In one embodiment of the present invention, the second-intermediate region 38 may include silicon carbide within a portion of the interstitial regions between the bonded diamond grains, along with metal-solvent catalyst from the metal-solvent-catalyst-containing material 26 and/or the substrate 12 within other portions of the interstitial regions of the second-intermediate region 38. In another embodiment of the present invention, substantially all of or only a portion of the interstitial regions of the second-intermediate region 38 may include an alloy of silicon and metal-solvent catalyst, such as a silicon-cobalt solid solution alloy or an intermetallic compound of cobalt and silicon. In yet another embodiment of the present invention, at least some of the interstitial regions of the second-intermediate region 38 may include one or more of the following materials: silicon carbide, metal-solvent catalyst, silicon, and an alloy of silicon and metal-solvent catalyst. The third region 40, adjacent to the substrate 12, includes substantially only metal-solvent catalyst from the substrate 12 or another source within the interstitial regions thereof for forming a strong, metallurgical bond between the polycrystalline diamond table 35 and the substrate 12.

Figure 9:
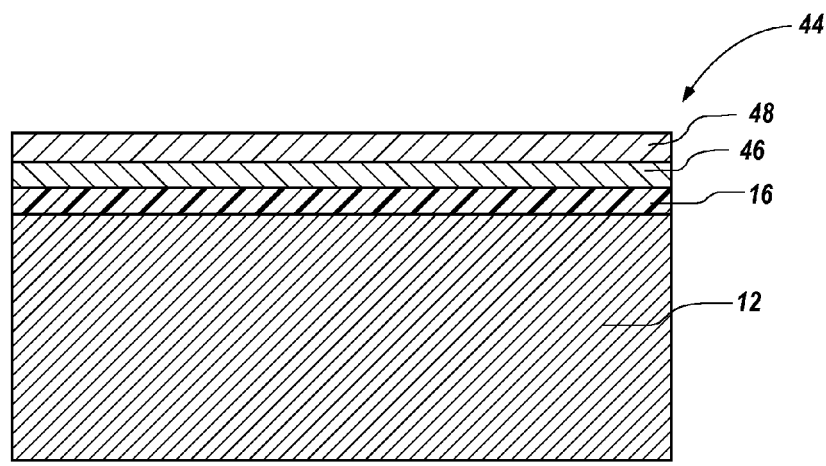
FIG. 9 is a schematic side cross-sectional view of an assembly including a substrate, a silicon-containing material, a diamond table, and porous mass used to fabricate a PDC according to another embodiment of the present invention.
Figure 10:
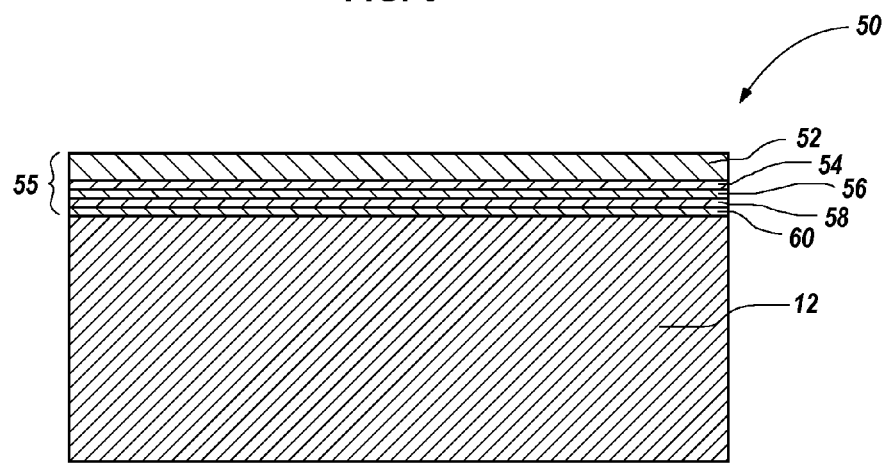
FIG. 10 is a schematic side cross-sectional view of the resulting structure formed from HPHT processing of the assembly shown in FIG. 9.
Figure 11:
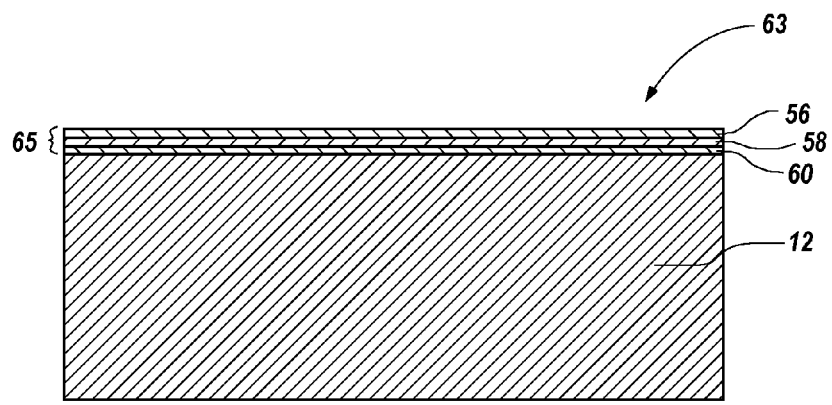
FIG. 11 is a PDC formed by removing a portion of the multi-region structure shown in FIG. 10.

FIGS. 9-11 show yet another embodiment of a method according to the present invention for forming a PDC. As shown in FIG. 9, an assembly 44 is formed by positioning a silicon-containing material 16 between a substrate 12 and a pre-sintered-polycrystalline diamond table 46. The polycrystalline diamond table 46 may exhibit a thickness of, for example, about 0.090 inches and an average grain size of about 20 μm or less. The polycrystalline diamond table 46 comprises bonded diamond grains sintered using a metal-solvent catalyst, such as cobalt, nickel, iron, or alloys thereof. Accordingly, the polycrystalline diamond table 46 includes bonded diamond grains with the metal-solvent catalyst occupying interstitial regions between the bonded diamond grains. In one embodiment of the present invention, the polycrystalline diamond table 46 may not be formed by sintering diamond particles in the presence of tungsten carbide so that the interstitial regions of the polycrystalline diamond table 46 contain no tungsten and/or tungsten carbide or insignificant amounts of tungsten and/or tungsten carbide. In other embodiments of the present invention, a portion or substantially the entire polycrystalline diamond table 46 may be formed to include tungsten and/or tungsten carbide distributed therethrough, as previously described with respect to the polycrystalline diamond body 14 shown in FIGS. 1A and 1B. For example, a first region of the polycrystalline diamond table 46 that is substantially free of tungsten and/or tungsten carbide may be positioned adjacent to the silicon-containing material 16, while a second region of the polycrystalline diamond table 46 that includes tungsten and/or tungsten carbide may be positioned remote from the silicon-containing material 16. The assembly 44 further includes a porous mass 48 positioned adjacent to the polycrystalline diamond table 46 on a side of the polycrystalline diamond table 46 opposite the silicon-containing material 16. The porous mass 48 may be unsintered diamond particles, unsintered aluminum oxide particles, unsintered silicon carbide particles, or another suitable porous mass. The porous mass 48 may also be a green body of diamond particles in the form of a tape-casted tape, or any other form, without limitation.

The assembly 44 may be subjected to an HPHT sintering process using sintering conditions similar to the sintering conditions employed on the assembly 10 to bond the various components of the assembly 44 together and to form a polycrystalline diamond structure 50 shown in FIG. 10. During sintering, silicon from the silicon-containing material 16 melts and displaces all or a portion of the metal-solvent catalyst of the polycrystalline diamond table 46 into the porous mass 48. Depending on the sintering temperature, the metal-solvent catalyst of the polycrystalline diamond table 46 may also be partially or completed molten at the same time as the silicon from the silicon-containing material 16. In one embodiment of the present invention, the amount of silicon-containing material 16 is selected so that substantially all of the metal-solvent catalyst of the polycrystalline diamond table 46 is displaced into the porous mass 48. In another embodiment of the present invention, the amount of the silicon-containing material 16 may be selected so that the silicon from the silicon-containing material 16 displaces only a portion of the metal-solvent catalyst of the polycrystalline diamond table 46. The silicon reacts with the diamond grains of the polycrystalline diamond table 46 or another carbon source to form silicon carbide within interstitial regions between the bonded diamond grains of the polycrystalline diamond table 46. Additionally, metal-solvent catalyst from the substrate 12 or another source also melts and infiltrates into a region of the polycrystalline diamond table 46 adjacent the substrate 12.

As shown in FIG. 10, the polycrystalline diamond structure 50 formed by HPHT processing of the assembly 44 comprises a multi-region polycrystalline diamond table 55 that may include: a first region 52, a second region 54, a third region 56, a fourth region 58, and a fifth region 60. The first region 52 includes the particles from the porous mass 48 with at least some of the interstitial regions thereof occupied by substantially only the metal-solvent catalyst displaced from the polycrystalline diamond table 46. The second region 54 includes the particles from the porous mass 48 with at least some of the interstitial regions thereof occupied by an alloy of silicon and metal-solvent catalyst, such as a silicon-cobalt solid solution alloy or an intermetallic compound of cobalt and silicon. Depending upon the amount of the silicon-containing material 16 employed, the second region 54 may also extend into the HPHT processed polycrystalline diamond table 46. The third region 56, fourth region 58, and fifth region 60 may be formed from the HPHT processed polycrystalline diamond table 46, which exhibits a reduced thickness due to the HPHT processing. The third region 56 includes polycrystalline diamond with substantially only silicon carbide within at least some of the interstitial regions between the bonded diamond grains. In one embodiment of the present invention, the fourth region 58 includes polycrystalline diamond with at least some of the interstitial regions thereof occupied by an alloy of silicon and metal-solvent catalyst, such as a silicon-cobalt solid solution alloy or an intermetallic compound of cobalt and silicon. In another embodiment of the present invention, the fourth region 58 may include polycrystalline diamond with silicon carbide formed within a portion of the interstitial regions between the bonded diamond grains of the fourth region 58 and metal-solvent catalyst (e.g., cobalt) occupying another portion of the interstitial regions between the bonded diamond grains of the fourth region 58. In yet another embodiment of the present invention, at least some of the interstitial regions of the fourth region 58 may include one or more of the following materials: silicon carbide, metal-solvent catalyst, silicon, and an alloy of silicon and metal-solvent catalyst. The fifth region 60, adjacent to the substrate 12, includes substantially only metal-solvent catalyst from the substrate 12 within at least some of the interstitial regions between bonded diamond grains for forming a strong, metallurgical bond between the multi-region polycrystalline diamond table 55 and the substrate 12.

As shown in FIG. 11, after forming the polycrystalline diamond structure 50, a PDC 63 including a multi-region structure 65 similar in configuration to the polycrystalline diamond table 15 shown in FIGS. 2A and 2B may be formed by removing the first region 52 and the second region 54 of the multi-region structure 65 using a lapping process, a grinding process, wire EDM, or another suitable material-removal process.

Figure 12:
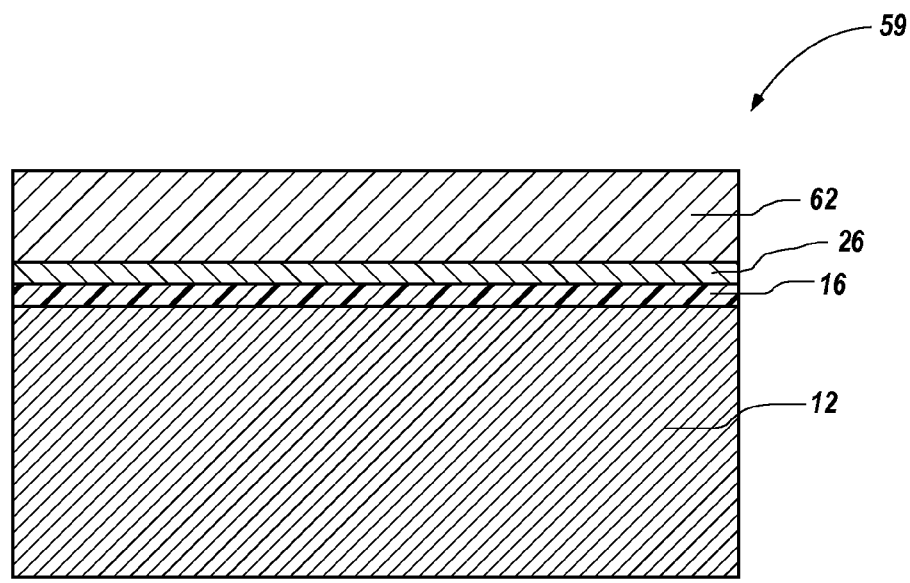
FIG. 12 is a schematic cross-sectional view of an assembly including a substrate, a mass of unsintered diamond particles, and layers of metal-solvent-catalyst-containing material and silicon-containing material disposed between the substrate and the mass of unsintered diamond particles used to fabricate a PDC according to another embodiment of the present invention.
Figure 13:
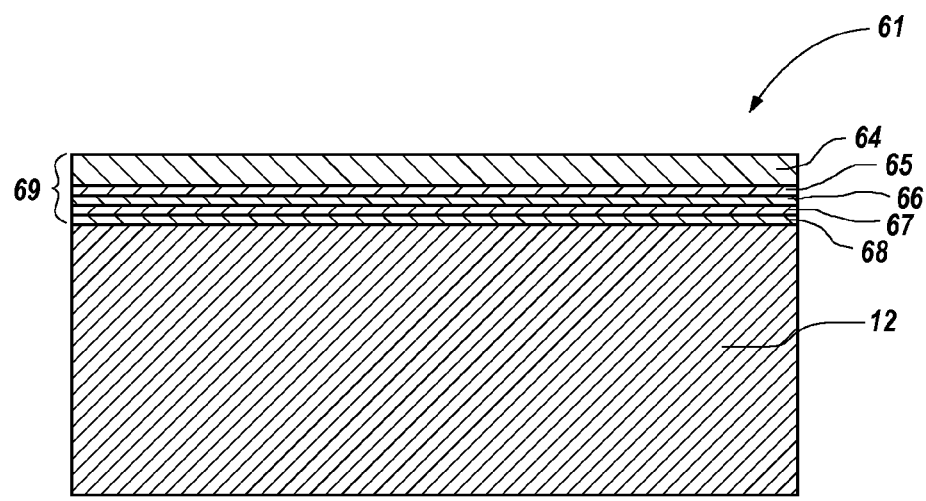
FIG. 13 is a schematic side cross-sectional view of the resulting structure from HPHT processing of the assembly shown in FIG. 12.

FIGS. 12 and 13 show yet another embodiment of a method according to the present invention for forming a PDC. As shown in FIG. 12, an assembly 59 includes a mass of unsintered diamond particles 62 with a silicon-containing material 16 and a metal-solvent catalyst-containing material 26 positioned between the mass of unsintered diamond particles 62 and a substrate 12. The metal-solvent-catalyst-containing material 26 is positioned adjacent to the mass of unsintered diamond particles 62 and the silicon-containing material 16 is positioned adjacent to the substrate 12. The assembly 59 may be subjected to an HPHT sintering process using sintering conditions similar to the sintering conditions employed on the assembly 10 to form a polycrystalline diamond structure 61 shown in FIG. 13. During HPHT sintering, the silicon-containing material 16 and the metal-solvent catalyst-containing material 26 are melted, and metal-solvent catalyst from the metal-solvent-catalyst-containing material 26 infiltrates the mass of unsintered diamond particles 62 to promote bonding between the diamond particles, thus, forming polycrystalline diamond that comprises bonded diamond grains with interstitial regions between the bonded diamond grains. The silicon from the silicon-containing material 16 follows the infiltration of the mass 62 by the metal-solvent-catalyst-containing material 26 and infiltrates the polycrystalline diamond so-formed. The silicon reacts with the diamond grains to form silicon carbide within some of the interstitial regions.

As shown in FIG. 13, the polycrystalline diamond structure 61 formed by HPHT sintering of the assembly 59 comprises a multi-region polycrystalline diamond table 69 that may include: a first region 64, a second region 65, a third region 66, a fourth region 67, and a fifth region 68. The first region 64 includes polycrystalline diamond with at least some of the interstitial regions thereof occupied by substantially only the metal-solvent catalyst from the metal-solvent-catalyst-containing material 26. In one embodiment of the present invention, the second region 65 includes polycrystalline diamond with at least some of the interstitial regions thereof occupied by an alloy of silicon and metal-solvent catalyst, such as a silicon-cobalt solid solution alloy or an intermetallic compound of cobalt and silicon. In another embodiment of the present invention, the second region 65 may include polycrystalline diamond with silicon carbide formed within a portion of the interstitial regions between the bonded diamond grains of the second region 65 and metal-solvent catalyst (e.g., cobalt) occupying another portion of the interstitial regions between the bonded diamond grains of the second region 65. In yet another embodiment of the present invention, at least some of the interstitial regions of the second region 65 may include one or more of the following materials: silicon carbide, metal-solvent catalyst, silicon, and an alloy of silicon and metal-solvent catalyst. The third region 66 includes polycrystalline diamond with substantially only silicon carbide within at least some of the interstitial regions thereof. The fourth region 67 may include a composition and microstructure that is the same or similar to the second region 65. The fifth region 68 adjacent to the substrate 12 includes substantially only metal-solvent catalyst from the substrate 12 or another source within the interstitial regions thereof for forming a strong, metallurgical bond between the multi-region polycrystalline diamond table 69 and the substrate 12. After forming the multi-region polycrystalline diamond table 69, a PDC including a polycrystalline diamond table similar in configuration to the polycrystalline diamond table 15 shown in FIGS. 2A and 2B may be formed by removing the first region 64 and the second region 65 using a lapping process, a grinding process, wire EDM, or another suitable material-removal process.

In the embodiments described above, silicon is introduced into a polycrystalline diamond table by infiltrating molten silicon. However, it is contemplated that silicon may be introduced in vapor form such as via chemical vapor deposition or another suitable vapor deposition process. Additionally, a polycrystalline diamond table that has been integrally formed with a cemented carbide substrate and leached to a selected depth from an upper surface thereof may also benefit from being infiltrated with silicon in molten or vapor form to form a more thermally-stable polycrystalline diamond table.

Figure 14:
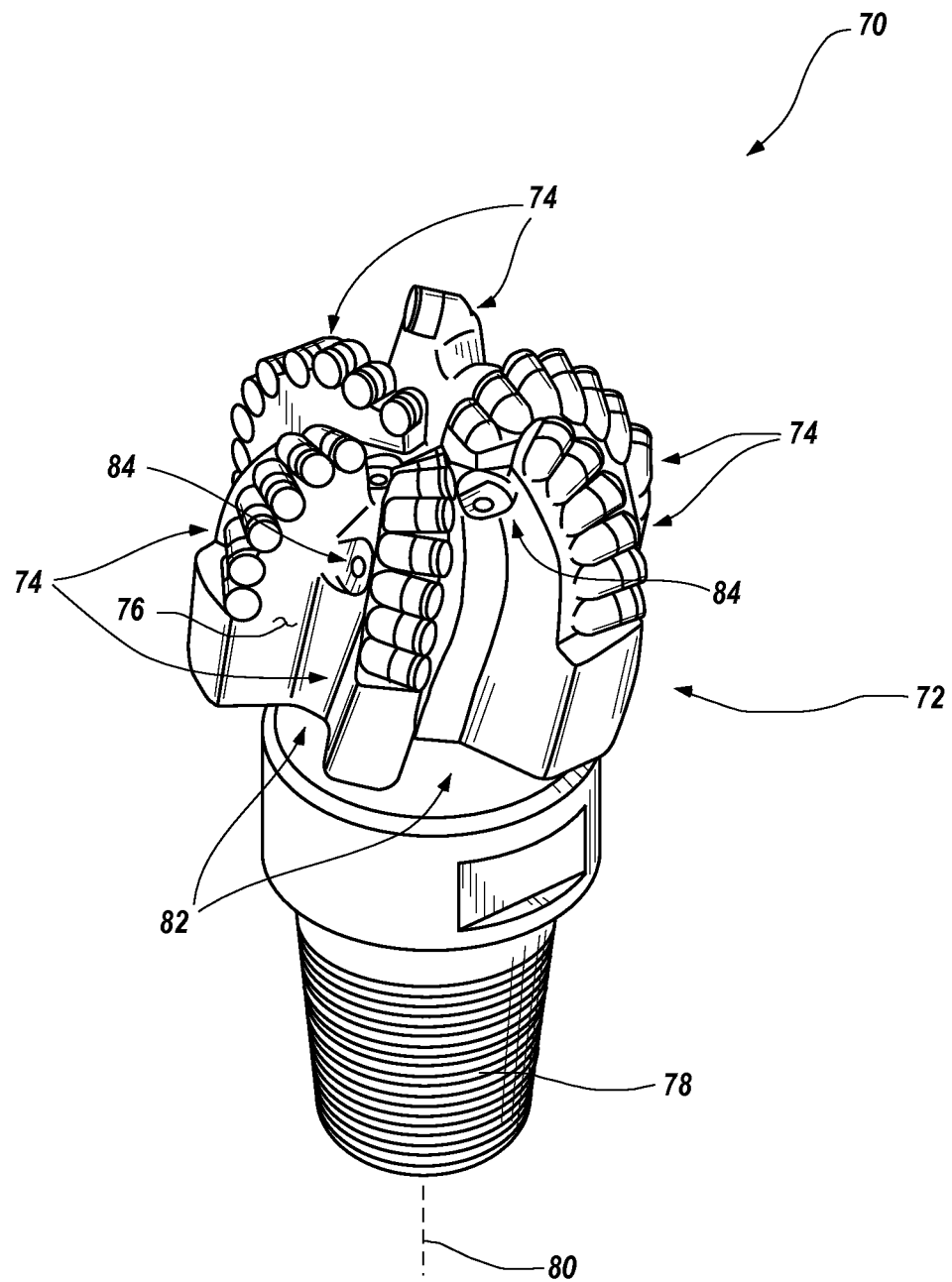
FIG. 14 is an isometric view of one embodiment of a rotary drill bit including at least one superabrasive cutting element including a PDC configured according to any of the various PDC embodiments of the present invention.
Figure 15:
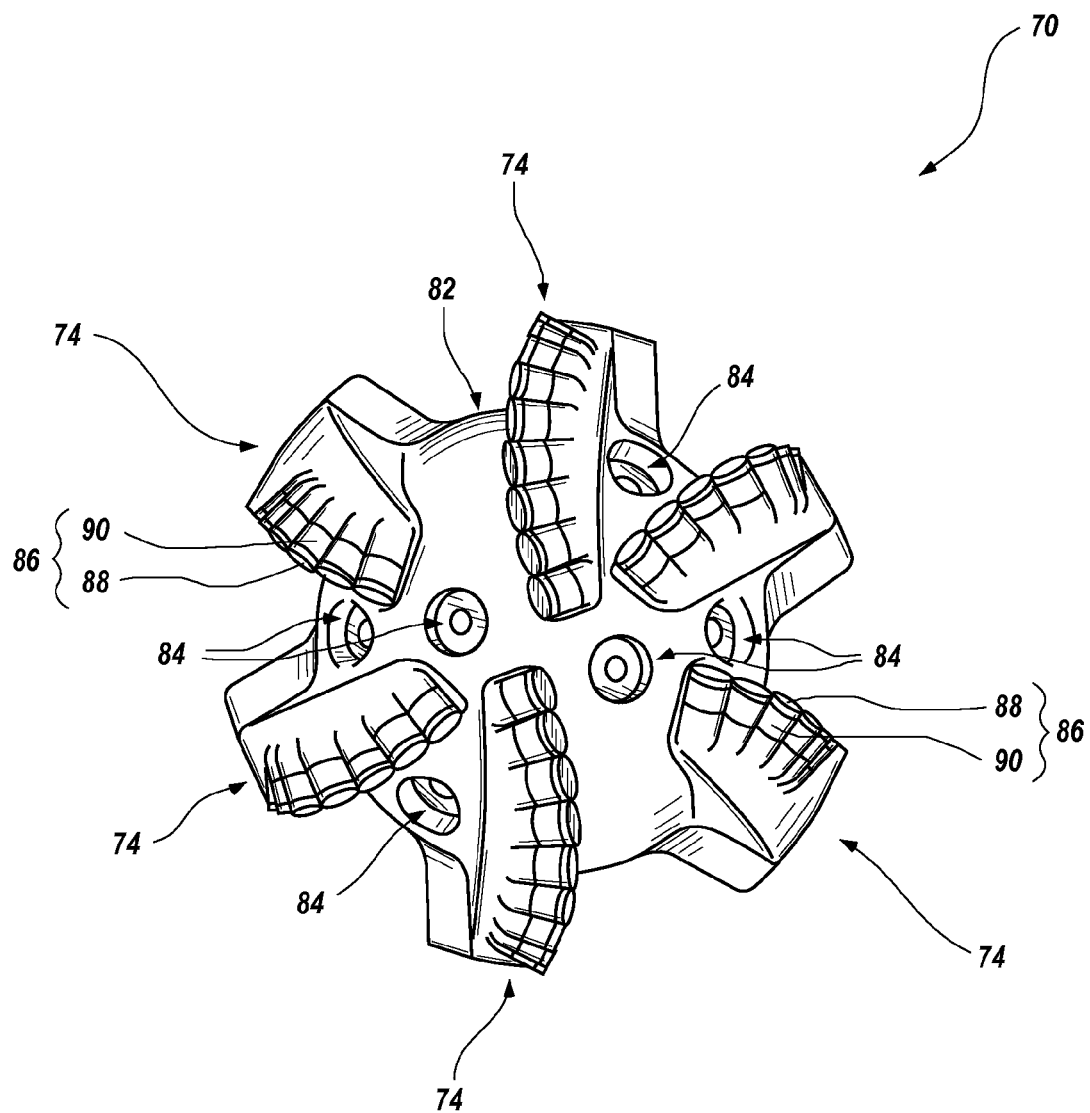
FIG. 15 is a top elevation view of the rotary drill bit of FIG. 14.

FIGS. 14 and 15 show an isometric view and a top elevation view, respectively, of a rotary drill bit 70 according to one embodiment of the present invention. The rotary drill bit 70 includes at least one PDC configured according to any of the previously described PDC embodiments. The rotary drill bit 70 comprises a bit body 72 that includes radially and longitudinally extending blades 74 with leading faces 76, and a threaded pin connection 78 for connecting the bit body 72 to a drilling string. The bit body 72 defines a leading end structure for drilling into a subterranean formation by rotation about a longitudinal axis 80 and application of weight-on-bit. At least one PDC, fabricated according to any of the previously described PDC embodiments, may be affixed to rotary drill bit 70. As best shown in FIG. 15, a plurality of PDCs 86 are secured to the blades 74. For example, each PDC 86 may include a polycrystalline diamond table 88 bonded to a substrate 90. More generally, the PDCs 86 may comprise any PDC disclosed herein, without limitation. In addition, if desired, in some embodiments of the present invention, a number of the PDCs 86 may be conventional in construction.

Also, circumferentially adjacent blades 74 define so-called junk slots 82 therebetween, as known in the art. Additionally, the rotary drill bit 70 includes a plurality of nozzle cavities 84 for communicating drilling fluid from the interior of the rotary drill bit 70 to the PDCs 86.

FIGS. 14 and 15 merely depict one embodiment of a rotary drill bit that employs at least one cutting element that comprises a PDC fabricated and structured in accordance with the disclosed embodiments, without limitation. The rotary drill bit 70 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

The PDCs disclosed herein may also be utilized in applications other than cutting technology. The disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used on any apparatus or structure in which at least one conventional PDC is typically used. For example, in one embodiment of the present invention, a rotor and a stator (i.e., a thrust bearing apparatus) may each include a PDC according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing PDCs disclosed herein may be incorporated. The embodiments of PDCs disclosed herein may also form all or part of heat sinks, wire dies, bearing elements, cutting elements, cutting inserts (e.g., on a roller cone type drill bit), machining inserts, or any other article of manufacture as known in the art. Other examples of articles of manufacture that may use any of the PDCs disclosed herein are disclosed in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

The following working examples of the present invention set forth various formulations for forming PDCs. The following working examples provide further detail in connection with the specific embodiments described above.

Comparative Working Example 1

Figure 16:
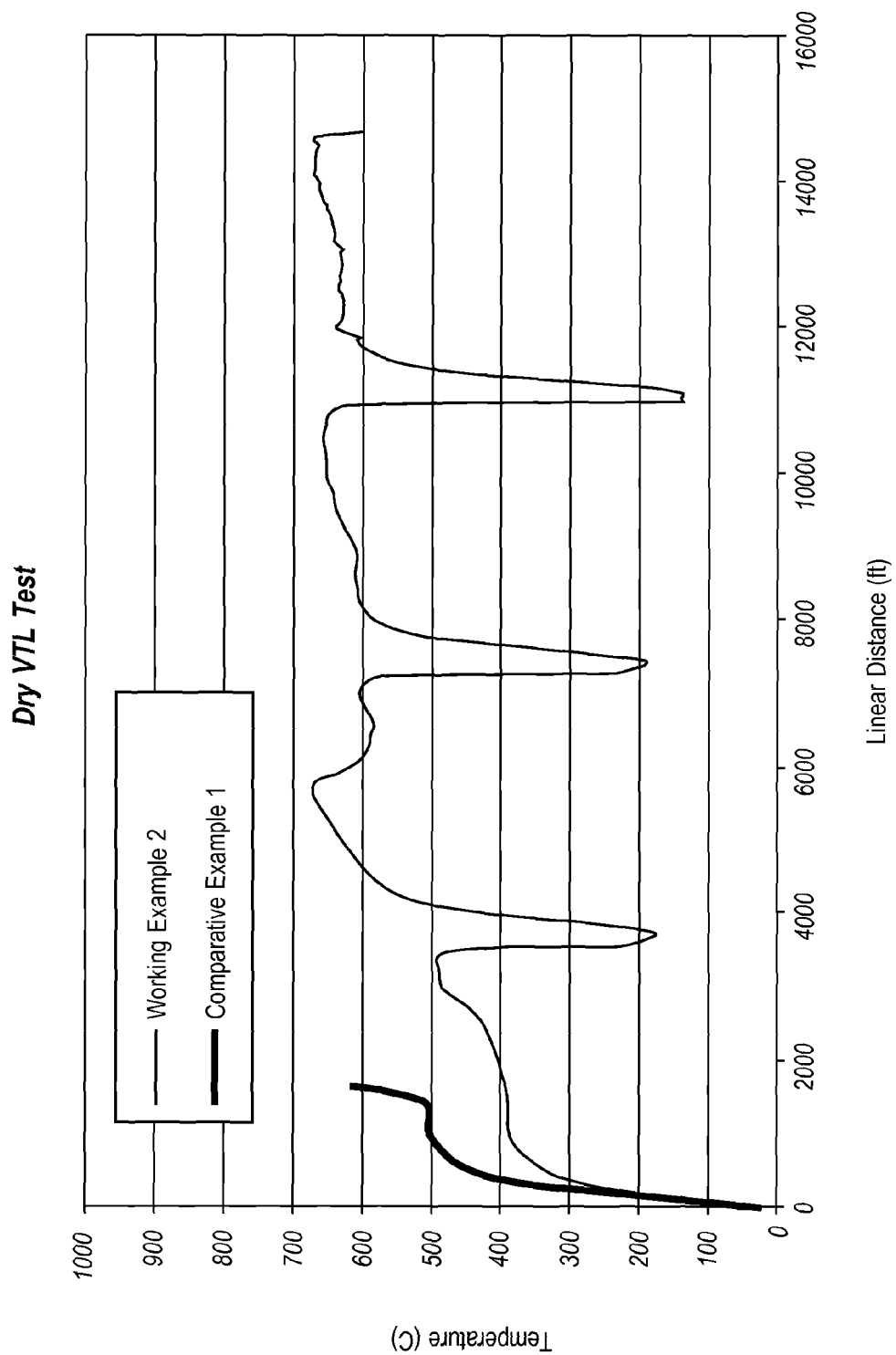
FIG. 16 is a graph showing the measured temperature versus linear distance during a vertical turret lathe test on a conventional, leached PDC and a PDC according to working example 2 of the present invention.

A conventional PDC was formed from a mixture of diamond particles having an average grain size of about 18 μm. The mixture was placed adjacent to a cobalt-cemented tungsten carbide substrate. The mixture and substrate were placed in a niobium can and HPHT sintered at a temperature of about 1400° Celsius and a pressure of about 5 GPa to about 8 GPa for about 90 seconds to form the conventional PDC. The conventional PDC was acid-leached to a depth of about 70 μm to remove substantially all of the cobalt from a region of the polycrystalline diamond table. The thickness of the polycrystalline diamond table of the PDC was 0.090 inches and a 0.012 inch chamfer was machined in the polycrystalline diamond table. The thermal stability of the conventional PDC so-formed was evaluated by measuring the distance cut in a Sierra White granite workpiece prior to failure without using coolant in a vertical turret lathe test. The distance cut is considered representative of the thermal stability of the PDC. The conventional PDC was able to cut a distance of about only 2000 linear feet in the workpiece prior to failure. Evidence of failure of the conventional PDC is best shown in FIG. 16 where the measured temperature of the conventional PDC during cutting increased dramatically at around about 2000 linear feet and in FIG. 17 where the normal force required to continue cutting also increased dramatically at around about 2000 linear feet.

Working Example 2

A PDC was formed by first fabricating a leached polycrystalline diamond body. The leached polycrystalline diamond body was formed by HPHT sintering diamond particles having an average grain size of about 18 μm in the presence of cobalt. The sintered-polycrystalline-diamond body included cobalt within the interstitial regions between bonded diamond grains. The sintered-polycrystalline-diamond body was leached using a solution of 90% nitric acid/10% de-ionized water for a time sufficient to remove substantially all of the cobalt from the interstitial regions to form the leached polycrystalline diamond body. The leached polycrystalline diamond body was placed adjacent to a cobalt-cemented tungsten carbide substrate. A green layer of silicon particles was placed adjacent to the leached polycrystalline diamond body on a side thereof opposite the cobalt-cemented tungsten carbide substrate. The leached polycrystalline diamond body, cobalt-cemented tungsten carbide substrate, and green layer of silicon particles were placed within a niobium can, and HPHT sintered at a temperature of about 1400° Celsius and a pressure of about 5 GPa to about 7 GPa for about 60 seconds to form a PDC that exhibited a similar multi-region diamond table as the polycrystalline diamond table 15 shown in FIGS. 2A and 2B, with silicon carbide formed in a portion of the interstitial regions between the bonded diamond grains. The thickness of the polycrystalline diamond table was about 0.090 inches and a chamfer of about 0.01065 inch was machined in the polycrystalline diamond table.

Figure 17:
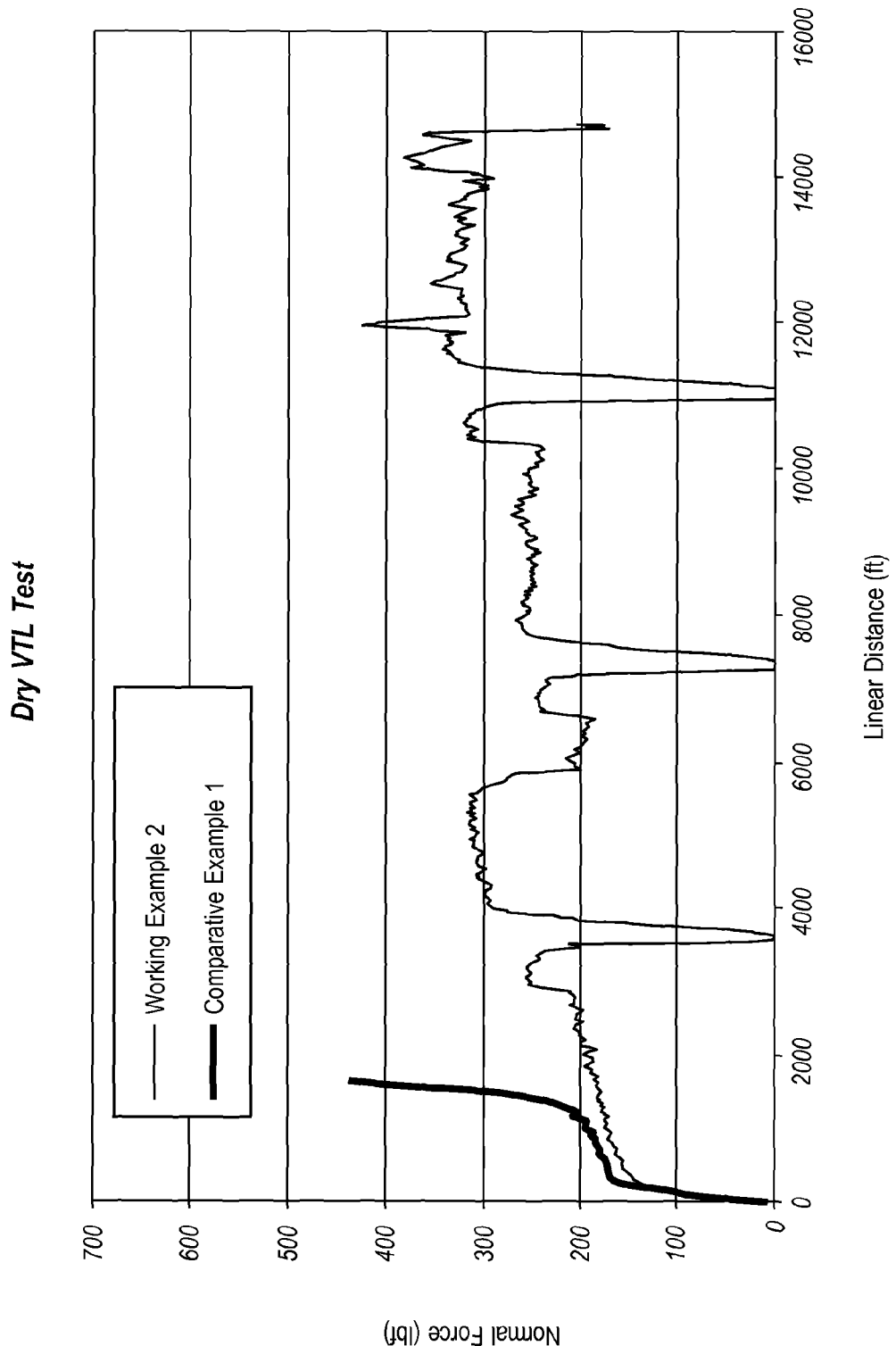
FIG. 17 is a graph showing the measured normal force versus linear distance during a vertical turret lathe test on a conventional, leached PDC and a PDC according to working example 2 of the present invention.

The thermal stability of the PDC of example 2 was evaluated by measuring the distance cut in a Sierra White granite workpiece without using coolant in a vertical turret lathe test. The PDC of example 2 was able to cut a distance of over 14000 linear feet in a granite workpiece without failing and without using coolant. This is best shown in FIGS. 16 and 17 where the measured temperature (FIG. 16) of the PDC of example 2 during cutting of the workpiece and the normal force required to continue cutting the workpiece (FIG. 17) does not increase dramatically as occurred with the conventional PDC of comparative example 1 during cutting. Therefore, thermal stability tests indicate that the PDC of example 2 exhibited a significantly improved thermal stability compared to the conventional PDC of comparative example 1.

Figure 18:
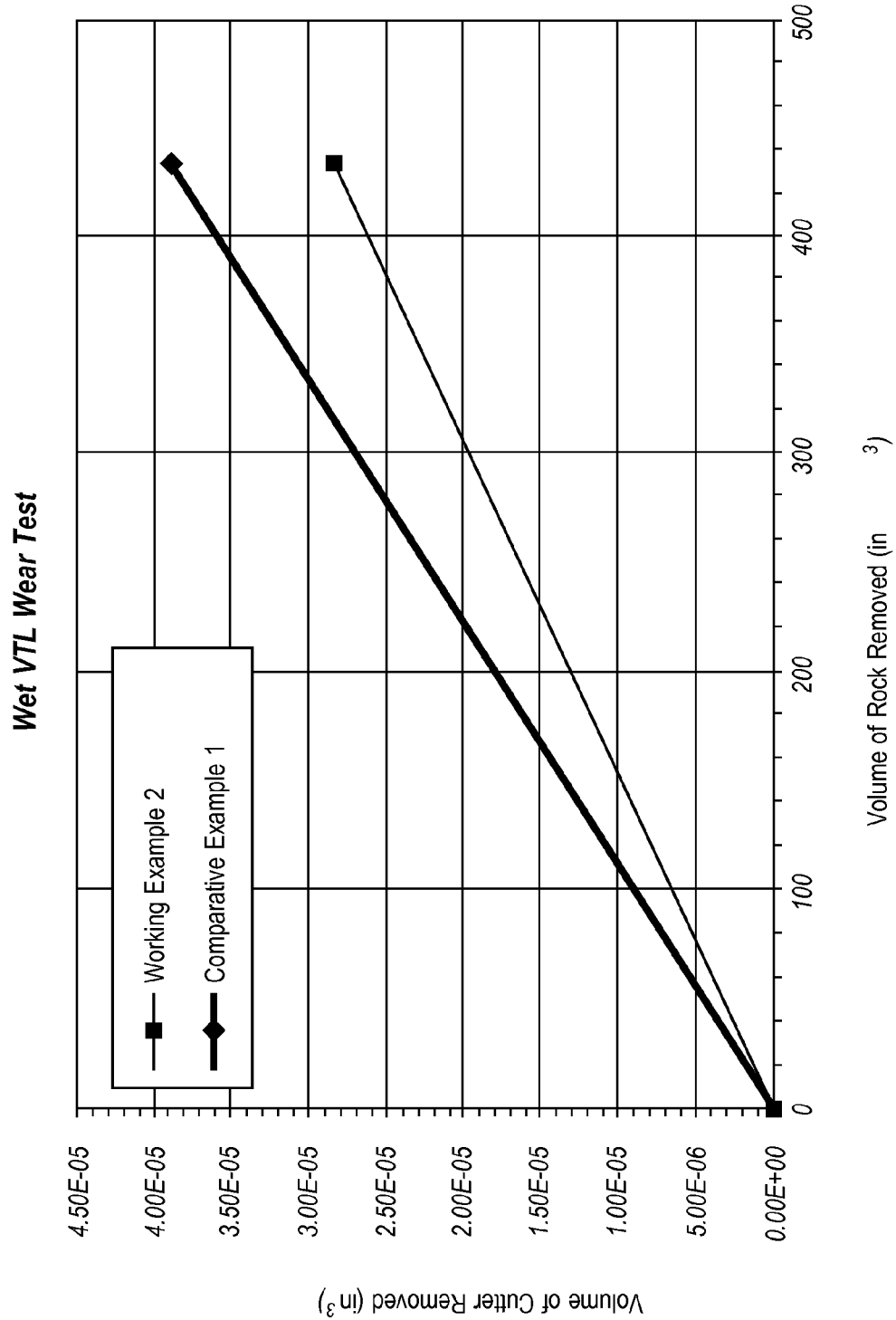
FIG. 18 is a graph illustrating the wear flat volume characteristics of a conventional, leached PDC and a PDC according to working example 2 of the present invention.

The wear resistance of the PDCs of comparative example 1 and example 2 were evaluated by measuring the volume of the PDC removed versus the volume of a Sierra White granite workpiece removed in a vertical turret lathe with water used as a coolant. As shown in FIG. 18, the wearflat volume tests indicated that the PDC of example 2 exhibited a slightly decreased wear resistance compared to the wear resistance of the PDC of comparative example 1. However, the wear resistance of the PDC of example 2 is still more than sufficient to function as a PDC for subterranean drilling applications. Drop-weight tests also indicated that a PDC fabricated according to example 2 exhibits an impact resistance similar to a conventionally fabricated PDC, such as the comparative example 1. Therefore, the PDC of example 2 exhibited a significantly superior thermal stability compared to the conventional PDC of comparative example 1 without significantly compromising wear resistance and impact resistance.

Although the present invention has been disclosed and described by way of some embodiments, it is apparent to those skilled in the art that several modifications to the described embodiments, as well as other embodiments of the present invention are possible without departing from the spirit and scope of the present invention. Additionally, the words "including" and "having," as used herein, including the claims, shall be open ended and have the same meaning as the word "comprising."

The invention claimed is:

1. A polycrystalline diamond compact, comprising:
a substrate; and
a polycrystalline diamond table attached to the substrate, the polycrystalline diamond table including an upper surface, at least one peripheral surface, and a preformed chamfer extending between the upper surface and the peripheral surface, diamond grains of the polycrystalline diamond table defining a plurality of interstitial regions, the polycrystalline diamond table including:
a first region extending inwardly from the upper surface and the preformed chamfer, the first region substantially contouring the upper surface and the preformed chamfer, the first region extending inwardly a depth measured inwardly from the upper surface that is substantially the same as a depth measured inwardly from and along substantially an entire cross-sectional length of the preformed chamfer, the first region including silicon carbide positioned within at least some of the interstitial regions thereof; and
a bonding region bonded to the substrate, the bonding region including metal-solvent catalyst positioned within a second portion of the interstitial regions.

2. The polycrystalline diamond compact of claim 1 wherein the first region is configured as an annular region that extends peripherally about a portion of the bonding region.

3. The polycrystalline diamond compact of claim 1 wherein the first region is extends along only a selected portion of the upper surface.

4. The polycrystalline diamond compact of claim 1 wherein the first region of the polycrystalline diamond table is substantially free of tungsten carbide.

5. The polycrystalline diamond compact of claim 1 wherein the polycrystalline diamond table comprises tungsten carbide.

6. The polycrystalline diamond compact of claim 1 wherein the diamond grains of the polycrystalline diamond table exhibit an average grain size of about 20 μm or less.

7. The polycrystalline diamond compact of claim 1 wherein the substrate comprises a cemented carbide material.

8. The polycrystalline diamond compact of claim 1 wherein the metal-solvent catalyst comprises cobalt, iron, nickel, or alloys thereof.

9. A rotary drill bit including a bit body adapted to engage a subterranean formation during drilling and at least one superabrasive cutting element affixed to the bit body, wherein the at least one superabrasive cutting element comprises the polycrystalline diamond compact according to claim 1.

* * * * *